US012401539B2

(12) United States Patent
Raghavan et al.

(10) Patent No.: US 12,401,539 B2
(45) Date of Patent: *Aug. 26, 2025

(54) MEETING INCLUSION AND HYBRID WORKPLACE INSIGHTS

(71) Applicant: Microsoft Technology Licensing, LLC, Redmond, WA (US)

(72) Inventors: Ananthatejas Raghavan, Redmond, WA (US); Cathleen Kong, Seattle, WA (US); Kayla Mailinh Tran, Redmond, WA (US); Preeti Goel, Kirkland, WA (US); Shamsi Tamara Iqbal, Sammamish, WA (US); Danielle Amanda Scott, Irvine, CA (US); Maja Vladan Milosavljevic, Lexington, MA (US); Wendy Guo, Edmonds, WA (US); Lisa Sarah Thomas, Bellevue, WA (US); Vivian Caroline Hua, Bellevue, WA (US); Shruti Poddar, Redmond, WA (US); Julian Alexander Zbogar-Smith, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,692

(22) Filed: Apr. 6, 2024

(65) Prior Publication Data

US 2024/0250840 A1 Jul. 25, 2024

Related U.S. Application Data

(63) Continuation of application No. 18/314,813, filed on May 9, 2023, now Pat. No. 11,985,001, which is a
(Continued)

(51) Int. Cl.
*H04L 12/18* (2006.01)
*G10L 25/72* (2013.01)
*G10L 25/78* (2013.01)

(52) U.S. Cl.
CPC .......... *H04L 12/1831* (2013.01); *G10L 25/72* (2013.01); *G10L 25/78* (2013.01); *H04L 12/1822* (2013.01); *G10L 2025/783* (2013.01)

(58) Field of Classification Search
None
See application file for complete search history.

(56) References Cited

U.S. PATENT DOCUMENTS 10,157,358 B1 * 12/2018 Brisebois ........... G06Q 10/1095
11,516,036 B1 * 11/2022 Harathi ............... H04L 12/1827
(Continued)

FOREIGN PATENT DOCUMENTS

WO WO-2014127055 A2 * 8/2014 ............. G06Q 10/00

*Primary Examiner* — Phyllis A Book
(74) *Attorney, Agent, or Firm* — Foley IP Law, PLLC

(57) ABSTRACT

The disclosure herein describes a system for calculating meeting inclusion metrics including insights and recommendations. Meeting data associated with one or more meetings attended by at least one participant remotely is converted into anonymized meeting data for inclusivity metric analysis. An inclusivity insights manager generates inclusivity metrics associated with inclusive behavior and language occurring during meetings to measure the level of inclusivity. The inclusivity metrics include attendee participation metrics measuring an amount of participation by each meeting attendee, participation in-person versus participation remotely, concurrent speech indicating attendees may be talking over one another or other interruptions occurring during meetings. Inclusivity metric data includes insights and actionable recommendations to improve inclusivity at future meetings provided at an individual level, group level or organizational level. The inclusivity insights can also
(Continued)

include percentage metric values, graphs, feedback, and other metric-related information for improving participation by meeting attendees.

20 Claims, 24 Drawing Sheets

Related U.S. Application Data continuation of application No. 17/566,826, filed on Dec. 31, 2021, now Pat. No. 11,689,381.

(56) References Cited

U.S. PATENT DOCUMENTS

| | | | |
|---|---|---|---|
| 2020/0202278 A1* | 6/2020 | Barton | G06Q 10/06315 |
| 2020/0279567 A1* | 9/2020 | Adlersberg | G06F 40/35 |
| 2020/0403817 A1* | 12/2020 | Daredia | G06F 16/483 |
| 2021/0058264 A1* | 2/2021 | Fahrendorff | H04L 12/1822 |
| 2021/0076002 A1* | 3/2021 | Peters | H04N 7/152 |
| 2021/0209562 A1* | 7/2021 | Lange | G06Q 10/1095 |
| 2021/0319408 A1* | 10/2021 | Jorasch | H04L 12/1827 |
| 2021/0406839 A1* | 12/2021 | Camenares | G10L 17/00 |
| 2022/0013114 A1* | 1/2022 | Camenares | G06N 20/00 |
| 2022/0014571 A1* | 1/2022 | Polish | H04L 65/1069 |
| 2022/0078366 A1* | 3/2022 | Dasdan | G06V 20/40 |

* cited by examiner

Meetings you organized
September 16 - October 14

Meeting participation

How much did attendees speak during meetings you organized?

Breakdown of meetings you've attended based on % of total speaking time, which can help you give you a perspective on meetings you can catch up later on.

In the last 4 weeks,

25 % of your meetings had active participation # of meetings 40.0

21.0

20.0

0.0

% of speaking time

☐ <50%  ☐ 50-75%  ■ >75%

Suggestions for you

ⓘ What we can improve

It is possible that the agenda was not relevant for everyone in the meeting. Consider revisiting your invitee list or use the meeting notes feature to create a collaborative agenda.

ⓘ What we can improve

Consider actively asking for input from those who have not had a chance to speak and intervene if someone dominates the conversation for long.

*FIG. 13*

Meeting speech overlap

How many times did participant speech overlap during meetings you organized?

It's hard to hear and access the content when multiple people are speaking – this is a breakdown of how it may impact your meetings.

In the last 4 weeks,

10 speech overlaps

Suggestions for you

What you're doing well
Insight not available. Check back next week.

What we can improve
Consider using the hand raise feature and the order of raised hands to ensure everyone can engage effectively.

```
0:0:0.0-->0:0:8.550
John Smith
And then we involved CS folks in that discussion, and after a bunch of back and forth, I think the PM's have kind of.

0:0:8.610-->0:0:10.830
John Smith
Come on distracted down here.

0:0:11.470-->0:0:29.100
John Smith
Uh, they feel like it is a lot of cognitive overload for the analyst itself to understand, like what these different, what it means when the filters are applied for a single row verses like multiple rows and the scope of that has been excluded for now.
```

FIG. 16A

|   | A | B | C | D | E | F | G | H | I | J | K |
|---|---|---|---|---|---|---|---|---|---|---|---|
| 1 | 0:0:0.0 0:0:8.550 | | | | | | | | | | |
| 2 | John Smith | | | | | | | | | | |
| 3 | And then we involved CS folks in that discussion, and after a bunch of back and forth, I think the PM's have kind of. | | | | | | | | | | |
| 4 | 0:0:8.610 0:0:10.830 | | | | | | | | | | |
| 5 | John Smith | | | | | | | | | | |
| 6 | Come on distracted down here. | | | | | | | | | | |
| 7 | 0:0:11.470 0:0:29.100 | | | | | | | | | | |
| 8 | John Smith | | | | | | | | | | |
| 9 | Uh, they feel like it is a lot of cognitive overload for the analyst itself to understand, like what these different, what it . . . | | | | | | | | | | |
| 10 | | | | | | | | | | | |

FIG. 16B

| | A | B | C | D | E | F | G |
|---|---|---|---|---|---|---|---|
| 1 | John Smit | 0:0:0.0 0:0:8.550 | | | | | |
| 2 | And then | John Smith | | | | | |
| 3 | 0:0:8.610 | And then we involved CS folks in that discussion, and after a bunch of b | | | | | |
| 4 | John Smit | 0:0:8.610 0:0:10.830 | | | | | |
| 5 | And then | John Smith | | | | | |
| 6 | 0:0:8.610 | Come on distracted down here. | | | | | |
| 7 | John Smit | 0:0:11.470 0:0:29.100 | | | | | |
| 8 | Uh, they f | John Smith | | | | | |
| 9 | | 0Uh, they feel like it is a lot of cognitive overload for the analyst itself to un | | | | | |
| 10 | | | | | | | |

| John Smith | 0:0:0.0 0:0:8.550 | 2021-10-02T0:0:0.0 | 2021-10-02T0:0:8.550Z |
|---|---|---|---|
| And then we involve | 12 | 2021-10-02TJohn | 2021-10-02TSmithZ |
| 0:0:8.610 0:0:10.830 | And then we involve | 2021-10-02TAnd | 2021-10-02Tthen we involved CS foll |
| John Smith | 0:0:8.610 0:0:10.830 | 2021-10-02T0:0:8.610 | 2021-10-02T0:0:10.830Z |
| Come on distracted | John Smith | 2021-10-02TJohn | 2021-10-02TSmithZ |
| 0:0:11.470 0:0:29.10 | Come on distracted | 2021-10-02TCome | 2021-10-02Ton distracted down here. |
| John Smith | 0:0:11.470 0:0:29.10 | 2021-10-02T0:0:11.470 | 2021-10-02T0:0:29.100Z |
| Uh, they feel like it | John Smith | 2021-10-02TJohn | 2021-10-02TSmithZ |
| | 0 Uh, they feel like it | 2021-10-02TUh, | 2021-10-02Tthey feel like it is a lot of |

| | | | | |
|---|---|---|---|---|
| TRUE | John Smith | 0:0:0.0 0:0:8.550 | John Smith | 2021-10-02T0:0:8.550Z |
| FALSE | And then we involve | | John Smith | 2021-10-02TSmithZ |
| FALSE | | 0:0:8.610 0:0:10.83 | And then we involv | 2021-10-02Tthen we involved |
| TRUE | John Smith | 0:0:8.610 0:0:10.83 | John Smith | 2021-10-02T0:0:10.830Z |
| FALSE | Come on distracted | | John Smith | 2021-10-02TSmithZ |
| FALSE | | 0:0:11.470 0:0:29.1 | Come on distracted | 2021-10-02Ton distracted dow |
| TRUE | John Smith | 0:0:11.470 0:0:29.1 | | 2021-10-02T0:0:29.100Z |
| FALSE | Uh, they feel like it | | John Smith | 2021-10-02TSmithZ |
| FALSE | | 0 | Uh, they feel like it is | 2021-10-02Tthey feel like it is |

| | isNumber | | | |
|---|---|---|---|---|
| 1 | | | | |
| 2 | TRUE | John Smith | 0:0:0.0 0:0:8.550 | 2021-10-02T0:0:0.0 | 2021-10-02T0:0:8.550Z |
| 5 | TRUE | John Smith | 0:0:8.610 0:0:10.83 | 2021-10-02T0:0:8.610 | 2021-10-02T0:0:10.830Z |
| 8 | TRUE | John Smith | 0:0:11.470 0:0:29.1 | 2021-10-02T0:0:11.470 | 2021-10-02T0:0:29.100Z |

| CallId | ActorId | ActiveSpeakerStartTime | ActiveSpeakerEndTime |
|---|---|---|---|
| CID850 | AID500 | 2021-10-10T0:0:0.000Z | 2021-10-10T0:0:8.550Z |
| CID850 | AID500 | 2021-10-10T0:0:8.610Z | 2021-10-10T0:0:10.830Z |
| CID850 | AID500 | 2021-10-10T0:0:11.470Z | 2021-10-10T0:0:29.100Z |

MEETING INCLUSION AND HYBRID WORKPLACE INSIGHTS

CROSS-REFERENCE TO RELATED APPLICATION(S) AND CLAIM OF PRIORITY

This application is a continuation of and claims priority to U.S. patent application Ser. No. 18/314,813 entitled "MEETING INCLUSION AND HYBRID WORKPLACE INSIGHTS" filed on May 9, 2023, which is a continuation of and claims priority to U.S. patent application Ser. No. 17/566,826 entitled "MEETING INCLUSION AND HYBRID WORKPLACE INSIGHTS" filed on Dec. 31, 2021, the disclosures of which are incorporated herein by reference in their entireties.

BACKGROUND

It is becoming increasingly common for people to attend meetings which are entirely virtual with all meeting attendees joining the meeting from remote locations via video conferencing technology. In other hybrid meeting situations, some people are available to attend a meeting in-person while other meeting attendees join the meeting in a hybrid virtual and in-person meeting environment. However, in these virtual and hybrid meeting situations, it can be difficult for meeting leaders to ensure that all meeting attendees are able to participate and feel included within the meeting due to the lack of face-to-face interaction with all attendees. This results in inefficient utilization of meeting attendees' time and talents.

SUMMARY

Some examples provide a system for providing meeting inclusion insights based on inclusivity metrics. A data storage device stores meeting data associated with a plurality of meetings. The meeting data includes meeting audio data or transcripts of the meeting audio data. An inclusivity insights manager analyzes the meeting data using inclusivity metrics. An inclusivity metric is used for measuring a level of inclusivity associated with participants attending meetings. The inclusivity insights manager calculates an inclusivity metric value that indicates the level of inclusivity for a given inclusivity metric. The inclusivity metric value is provided to a user via a user interface. The inclusivity metric value is presented to the user with an inclusivity insight and an actionable recommendation. The recommendation is an action which can be taken by the user for improving meeting inclusion in a next meeting attended by at least one participant in the plurality of participants.

Other examples provide a method for providing meeting inclusion insights based on inclusivity metrics. The meeting data is analyzed using an inclusivity metric. An inclusivity metric value is calculated. The inclusivity metric value is provided to the user. The inclusivity metric value can be displayed to the user via a user interface device.

Still other examples provide a non-transitory computer readable storage devices having computer-executable instructions for providing meeting inclusion insights. An inclusivity insights manager aggregates meeting data associated with a plurality of meetings attended by a plurality of participants. The meeting data includes audio data of the plurality of meetings or a transcript of the audio data of the plurality of meetings. The inclusivity insights manager analyzes the meeting data using an inclusivity metric for evaluating meeting inclusion associated with the plurality of participants attending at least one meeting in the plurality of meetings. The inclusivity insights manager calculates an inclusivity metric value using the meeting data and the inclusivity metric. The inclusivity metric value includes a score indicating a level of inclusivity associated with at least one participant in the plurality of participants attending at least one meeting in the plurality of meetings. The inclusivity metric value is provided to a user via the user interface device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 13 is a block diagram illustrating an inclusivity metrics summary page including group level inclusivity metrics data.

FIG. 14 is a block diagram illustrating an inclusivity metrics summary page including group level concurrent speech metrics data.

FIG. 16A is a block diagram illustrating text in word format representing content of a meeting that is downloaded from a source after a meeting is recorded.

FIG. 16B is a block diagram illustrating a spreadsheet containing text from the word format file.

FIG. 16C is a block diagram illustrating adding a column to the spreadsheet for each meeting participants name.

FIG. 16E is a block diagram illustrating concatenation of an end time associated with a user speaking during the meeting.

FIG. 16F is a block diagram illustrating addition of a column to the spreadsheet for true and false values associated with each row.

FIG. 16G is a block diagram illustrating addition of a filter to copy valid rows from the spreadsheet into a new spreadsheet.

FIG. 16H is a block diagram illustrating changing user names in the new spreadsheet to a user ID for each user.

Corresponding reference characters indicate corresponding parts throughout the drawings.

DETAILED DESCRIPTION

Figure 1:
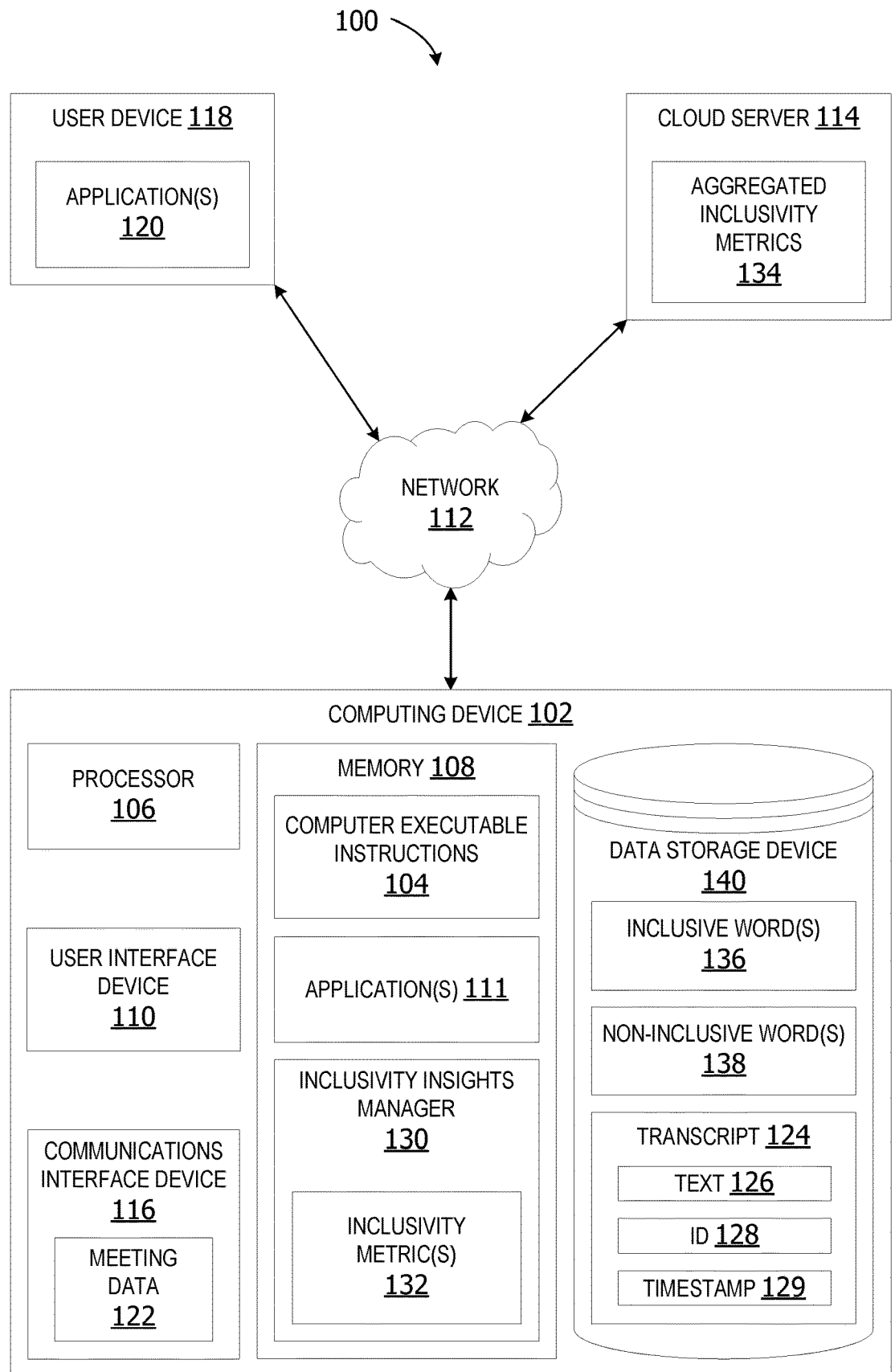
FIG. 1 is a block diagram illustrating a processing system for generating meeting inclusion insights based on inclusivity metrics according to some embodiments.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

As more people work remotely from home and attend more meetings remotely it raises new challenges and problems for meeting attendees as well as meeting coordinators. For example, during a virtual (remote) meeting hosted on a virtual meeting platform, some people may speak for most of the time while other meeting attendees participate very little or not at all. This results in a loss of productivity and possibly wasted time, as well as talent. Moreover, during a meeting where one or more attendees are not present in the same room as the presenter, it can be challenging for the presenter to determine who is speaking and who is not participating. Surveys can be used to obtain user feedback and meeting-related data from meeting participants. This information can be used to attempt to improve the user's experience while attending virtual meetings. However, not all meeting participants have time to fill out surveys with the frequency necessary to generate meaningful meeting performance metrics. Moreover, information provided by users may be inaccurate or incomplete, reducing the usability of survey data. Moreover, surveys are time-consuming and burdensome for many users.

Meeting attendees participating remotely may also be more hesitant to participate in virtual meetings than they might be if they were attending in person. Due to the difficulties of determining which participant is speaking and when speaking ceases, unintentional interruptions may occur more frequently during virtual meetings. These and other factors make it difficult for meeting attendees as well as meeting leaders to make all participants of meetings feel included and encouraged to participate in virtual and hybrid meetings.

Referring to the figures, examples of the disclosure enable creation of inclusivity data for measuring and evaluating levels of inclusivity in virtual and hybrid meetings. In some examples, an inclusivity insights manager aggregates meeting data from a plurality of meetings. The meeting data is analyzed using inclusivity metrics to generate inclusivity metric values for meeting attendee participation during meetings, use of inclusive language, attendee participation in remote meetings versus participation in-person and/or occurrences of concurrent speech. This inclusivity data is used to generate inclusivity insights and actionable recommendations to assist users in improving inclusive behavior and inclusive speech during future meetings.

Aspects of the disclosure further enable provision of inclusivity metric data, including insights and actionable recommendations, to improve feelings of inclusion during meetings while preventing tying of specific inclusivity behaviors to specific meeting attendees. This enables meeting members to improve inclusive behavior and language used during meetings without tying results to specific meeting participants to protect user anonymity.

The inclusivity insights manager in other examples determines and evaluates inclusivity metrics from meetings to share with individuals, leaders in an organization, or others at a user-selected level. To determine metrics, the inclusivity insights manager considers factors such as speaking time, participation, inclusive language scan, etc. The inclusivity metrics data is used to encourage more inclusive behaviors across various remote/virtual meeting setups. This helps ensure all meeting participants feel included in their meetings while increasing efficiency of time and resource usage.

In some examples, the metrics are presented to an individual, a leader or organization in an aggregated, non-intrusive way to help improve overall culture of the group or organization without linking the metric data to specific individuals. The metric data includes metrics for speaking time which measure how much time each participant (attendee) in a meeting speaks. In-person versus remote participation metrics measure how much participants speak when attending in-person and how much they speak when attending virtually. The inclusive language check is a scan that checks for words in a list of flagged words. The inclusive language metrics can track only inclusive language, only track non-inclusive language or track both inclusive language as well as non-inclusive language.

In other examples, the system allows for a quick way to surface inclusion information to an organization without the need for use of surveys or any other such tedious methods. The system presents aggregated insights per person, leader, or organization and leverages other meeting-related information already present in the system. This allows for richer insights and allows the user to analyze the information by slicing and dicing the information based on various attributes useful to the customer. The metrics can be used to ensure people working remotely feel included, participants participate in meetings in a culturally sensitive way that increases participation by meeting attendees in an atmosphere conducive to the free sharing of ideas and improved collaboration.

In other examples, the inclusivity insights manager anonymizes the meeting data by replacing user names with an anonymous identifier to protect the identify of meeting attendees. The inclusivity metric data generated by the inclusivity insights manager is anonymized such that a user viewing the inclusivity metrics data are unable to determine which meeting attendee did not participate in a meeting, which users used non-inclusive language and/or which meeting attendee spoke concurrently with another attendee. In this manner, user privacy is protected, and managers/leaders and others are provided with meeting inclusion insights while preventing meeting attendee identification associated with the inclusivity data.

The system operates in an unconventional manner by automatically analyzing meeting data and leveraging pre-existing meeting-related data to generate inclusivity scores, inclusivity insights and actionable recommendations to increase inclusive behaviors and inclusive language in future meetings. In this manner, the system allows increased feelings of inclusion and more efficient utilization of meeting attendee time and talents, thereby improving the hybrid and virtual meetings provided by the underlying device.

Referring again to FIG. 1, a block diagram illustrates a processing system 100 for generating meeting inclusion insights based on inclusivity metrics according to some embodiments. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 6, FIG. 7, and FIG. 8).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown).

The memory 108 stores data, such as one or more applications 111. The applications 11, when executed by the processor 106, operate to perform functionality on the computing device 102. The applications 111 can communicate with counterpart applications or services, such as web services on a cloud server 114 accessible via a network 112.

In an example, the applications 111 represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 116. The communications interface device 116 includes a network interface card and/or computer-executable instructions (e.g., a driver) for operating the network interface card. Communication between the computing device 102 and other devices, such as but not limited to the user device 118 and/or the cloud server 114, can occur using any protocol or mechanism over any wired or wireless connection. In some examples, the communications interface device 116 is operable with short range communication technologies such as by using near-field communication (NFC) tags.

The user device 118 represent any device executing computer-executable instructions. The user device 118 can be implemented as a mobile computing device, such as, but not limited to, a wearable computing device, a mobile telephone, laptop, tablet, computing pad, netbook, gaming device, and/or any other portable device. The user device 118 includes at least one processor and a memory. The user device 118 can also include a user interface component.

In some examples, the user device 118 is a computing device utilized by a remote meeting attendee to remotely connect to a virtual meeting or a hybrid meeting. The user device 118 includes one or more application(s) 120 enabling the user device 118 to connect to the virtual meeting platform. A virtual meeting platform enables a user to attend a virtual meeting, such as, but not limited to, Microsoft® Teams. The user associated with the user device 118 interacts with one or more other meeting attendees virtually via the application(s) 120.

Meeting data 122 is generated during the virtual meeting. The meeting data 122 includes audio data including an audio recording of virtual meetings occurring. The meeting data 122 is received by the computing device 102 via the communications interface device 116. The meeting data 122 is automatically converted into a transcript 124 via natural language processing (NLP).

The transcript 124 in some examples includes text 126 of the communications (spoken words) occurring during the meetings. The transcript 124 also includes an identification (ID) 128 of each speaker speaking during the meeting. The transcript 124 includes a timestamp 129 for each portion of text 126. The timestamp indicates a date and/or time at which each portion of text or communication is generated during a given meeting.

An inclusivity insights manager 130 aggregates meeting data associated with a plurality of meetings attended by meeting attendees. The meeting data 122 includes audio data of virtual and hybrid virtual meetings and/or transcript(s) of the audio data for a plurality of meetings, such as the transcript 124. The inclusivity insights manager 130 analyzes the meeting data using the inclusivity metric(s) 132 for evaluating meeting inclusion associated with the participants attending one or more meeting(s). The inclusivity metric(s) 132 include metrics for evaluating or measuring inclusivity associated with speaking participation by attendees of the meetings, participation of remote meeting attendees versus in-person attendees at meetings, concurrent (overlapping) speech and/or use of inclusive language during the meetings.

In other examples, the inclusivity insights manager 130 calculates an inclusivity metric value measuring inclusivity using the meeting data 122 and the inclusivity metric(s) 132. The inclusivity metrics can include a score, a ranking, a percentage, or other value indicating the level of inclusivity for one or more of these metrics. The inclusivity insights manager 130 provides or otherwise presents the inclusivity metric value(s) to at least one user via the user interface device 110 and/or the inclusivity insights manager 130 transmits the inclusivity metric value(s) to the user device 118 for display to a user via a user interface on the user device 118.

The cloud server 114 is a logical server providing services to the computing device 102 or other clients, such as, but not limited to, the user device 118. The cloud server 114 is hosted and/or delivered via the network 112. In some non-limiting examples, the cloud server 114 is associated with one or more physical servers in one or more data centers. In other examples, the cloud server 114 is associated with a distributed network of servers.

In this example, the inclusivity insights manager 130 executes on the computing device 102 and analyzes the meeting data 122 using the inclusivity metric(s) 132 to generate inclusivity metric data. The inclusivity metric data includes inclusivity metric values, inclusivity insights and/or actionable recommendations based on the inclusivity metric values generated. The inclusivity metric values include scores, ranks, percentages, numbers of instances of an occurrence or other data values associated with a level of inclusivity associated with attendees participating (speaking), concurrent speaking and/or use of inclusive language.

The inclusivity insights manager 130 in other examples executes on the cloud server 114. The inclusivity insights manager 130 utilizes aggregated inclusivity metrics 134 to generate meeting inclusion insights and recommendations. The aggregated inclusivity metrics 134 includes inclusivity metrics for aggregated meeting data 122. Aggregated meeting data 122 is meeting data 122 for a plurality of meetings.

In still other examples, the inclusivity insights manager 130 analyzes meeting data 122, including the transcript 124 to generate inclusivity metric values indicating levels of inclusivity. In these examples, the inclusivity insights manager 130 scans the transcript 124 for inclusive word(s) 136 and/or non-inclusive word(s) 138. The inclusive word(s) 136 and/or the non-inclusive word(s) 138 can be identified based on a list of inclusive words or a list of non-inclusive words. In an example, the inclusivity insights manager 130 scans the transcript for non-inclusive word(s) 138. The inclusivity metric score is generated based on the number of non-inclusive words detected or otherwise flagged.

In other examples, the inclusivity insights manager 130 anonymizes the meeting data 122 to protect the identify of meeting attendees. The inclusivity metric data generated by the inclusivity insights manager 130 is anonymized such that a user viewing the inclusivity metrics data are unable to determine which meeting attendee did not participate in a meeting, which users used non-inclusive language and/or which meeting attendee spoke concurrently with another attendee.

The processing system 100 can optionally include a data storage device 140 for storing data, such as, but not limited to the inclusive word(s) 136, the non-inclusive word(s) 138 and/or the meeting data 122. The meeting data 122 includes meeting audio data for one or more meetings and/or transcripts of the meetings. The data storage device 140 can include one or more different types of data storage devices, such as, for example, one or more rotating disks drives, one or more solid state drives (SSDs), and/or any other type of data storage device. The data storage device 140 in some non-limiting examples includes a redundant array of independent disks (RAID) array. In other examples, the data storage device 140 includes a database.

The data storage device 140 in this example is included within the computing device 102, attached to the computing device, plugged into the computing device, or otherwise associated with the computing device 102. In other examples, the data storage device 140 includes a remote data storage accessed by the computing device via the network 112, such as a remote data storage device, a data storage in a remote data center, or a cloud storage.

Figure 2:
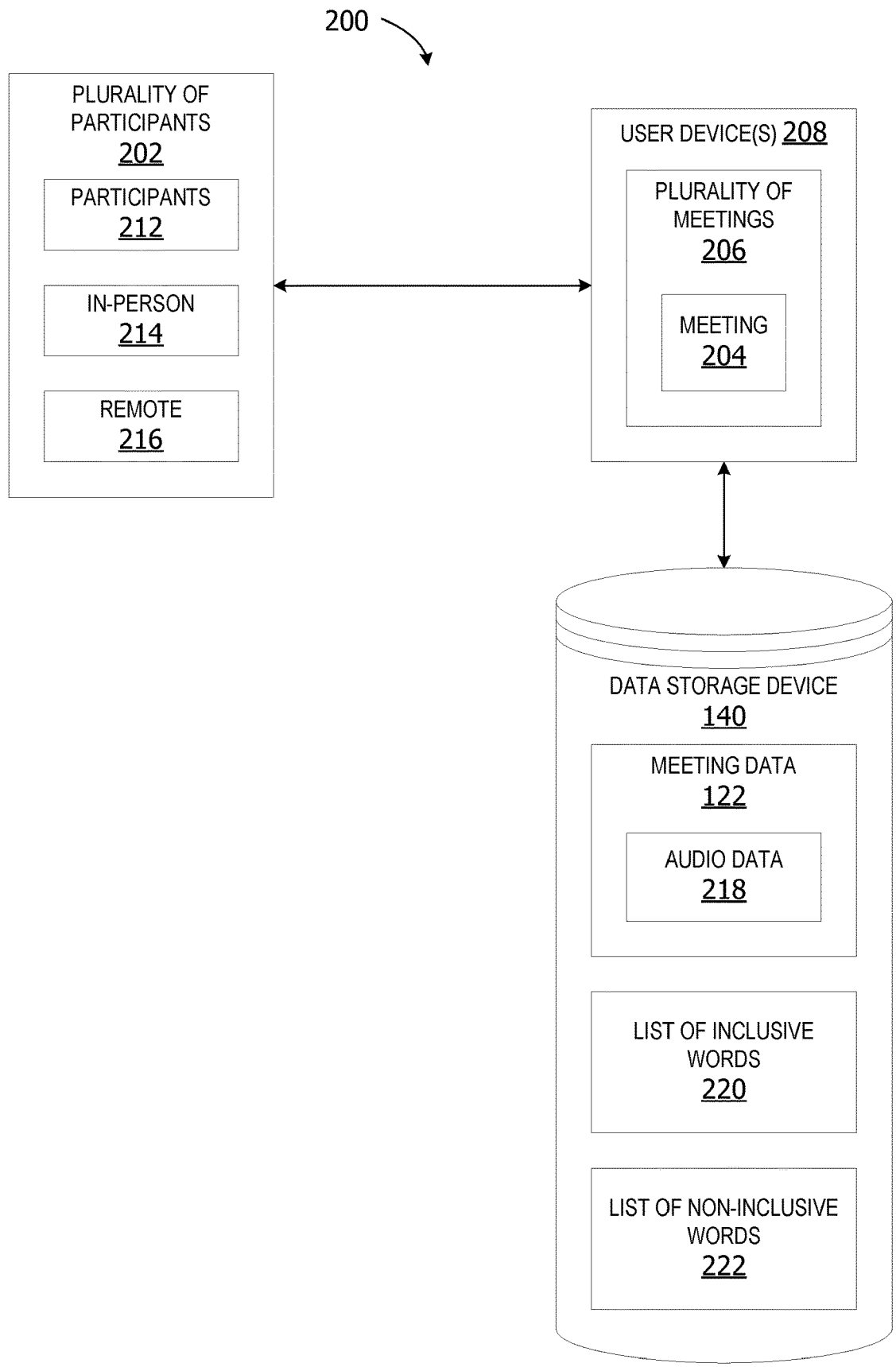
FIG. 2 is a block diagram illustrating a system for generating meeting data used for creating meeting inclusion insights and recommendations based on inclusivity metrics according to some embodiments.

FIG. 2 is a block diagram illustrating a system 200 for generating meeting data 122 used for creating meeting inclusion insights and recommendations based on inclusivity metrics according to some embodiments. In some examples, a plurality of participants 202 attending a virtual meeting 204 in a plurality of meetings 206 hosted on one or more user device(s) 208. The virtual meeting 204 is a meeting in which all the participants are attending the meeting remotely. The meeting 204 can also be a hybrid meeting in which one or more participants are attending in-person, such as in a conference room, and one or more participants are attending remotely via a network connection, such as the network 112 in FIG. 1.

The plurality of participants 202 include two or more meeting attendees. A participant 212 is an attendee in the plurality of participants attending the meeting either in-person 214 or via remote 216 attendance. Remote 216 attendance refers to attending a meeting virtually rather than in-person.

The meeting data 122 in some examples is stored on the data storage device 140 for analysis during inclusivity metric analysis. The meeting data 122 in this example includes audio data 218. The audio data 218 is an audio recording of speech occurring during a meeting 204. In these examples, the system can optionally use voice recognition on the audio data 218 to recognize participants present in the meeting and/or identify a speaker during virtual or hybrid in-person meetings.

In some examples, the meeting data is analyzed using a list of inclusive words 220. The list of inclusive words 220 includes one or more words identified as inclusive. The inclusivity insights manager analyzes the meeting data to identify instances of inclusive words occurring during the meeting(s). The inclusivity insights manager flags instances of inclusive words. The inclusivity insights manager provides inclusivity insights including feedback identifying the number of inclusive words identified, the percentage of inclusive words used during the meeting(s) and/or scores/rankings associated with use of inclusive words in the meetings. The insight in these examples includes positive feedback acknowledging inclusiveness and encouraging meeting participants, leaders, managers and/or organizers with regard to usage of inclusive words improving inclusivity during meetings.

In other examples, the meeting data is analyzed using a list of non-inclusive words 222. The list of non-inclusive words 222 includes one or more words identified as non-inclusive to be avoided during meetings. The inclusivity insights manager analyzes the meeting data to flag instances of non-inclusive words occurring during the meeting(s). The inclusivity insights manager counts or otherwise measures instances of non-inclusive words used by participants attending the meeting(s). The inclusivity insights manager provides inclusivity insights including feedback identifying the number of non-inclusive words identified, the percentage of non-inclusive words used during the meeting(s) and/or scores/rankings associated with use of non-inclusive words in the meetings. The insight in these examples includes actionable recommendations for replacing non-inclusive words with more inclusive words during future meetings.

Figure 3:
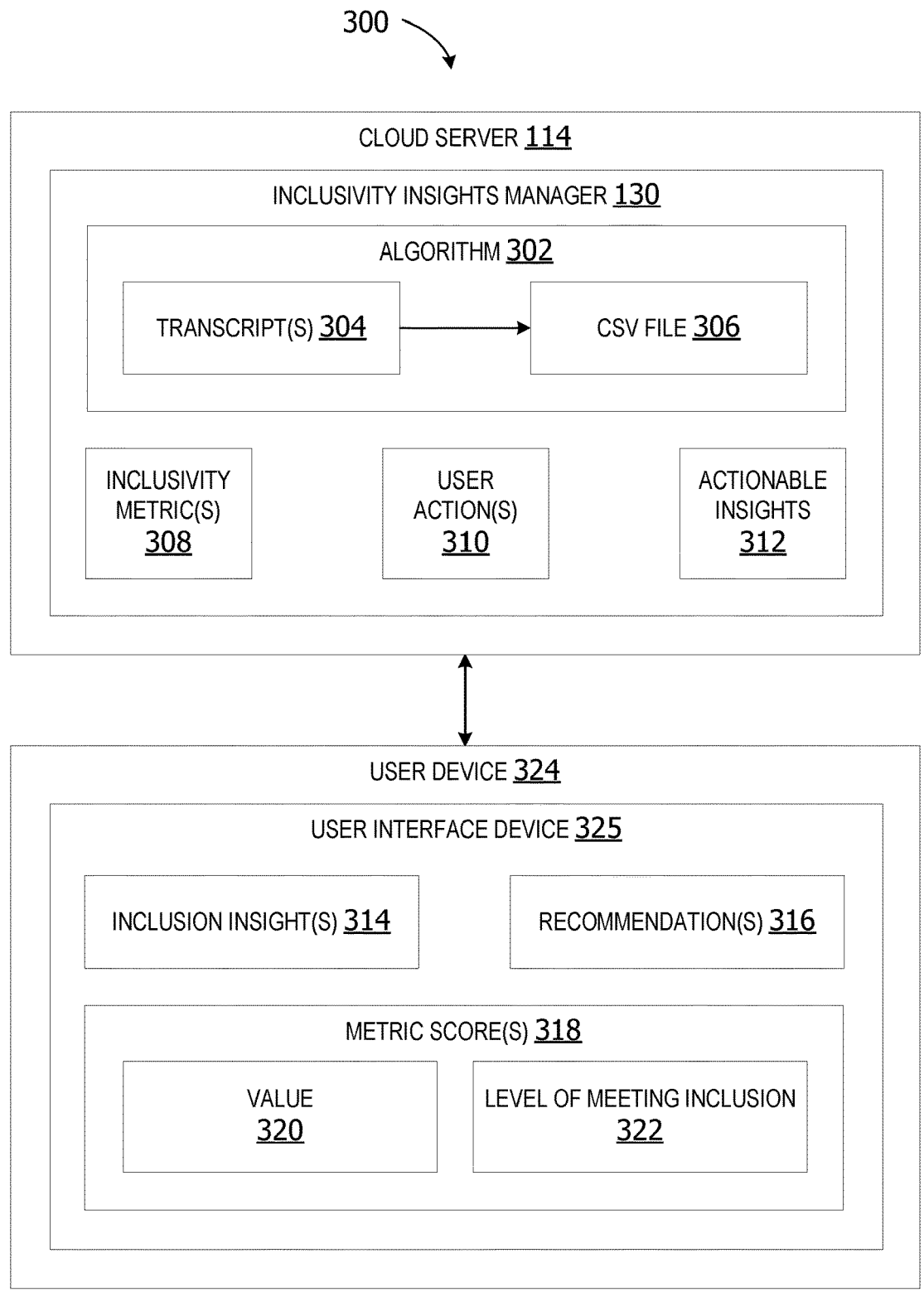
FIG. 3 is a block diagram illustrating a system for analyzing meeting data by an inclusivity insights manager on a cloud server according to some embodiments.

FIG. 3 is a block diagram illustrating a system 300 for analyzing meeting data by an inclusivity insights manager 130 on a cloud server 114 according to some embodiments. The inclusivity insights manager 130 applies an algorithm 302 to meeting data. In some examples, the algorithm 302 includes NLP for converting an audio data in an audio file into a transcript 304 in a word document. In other examples, the inclusivity insights manager 130 receives the transcript 304 already in a text format rather than receiving audio data to be converted into a transcript. In this example, the algorithm 302 converts the transcript in the word file into a comma separated value (CSV) file 306.

The inclusivity insights manager 130 analyzes the data in the CSV file 306 (.CSV file extension) to generate inclusivity metric(s) 308 and user action(s) 310 to generate actionable insights 312. The actionable insights 312 include inclusivity metric data, such as, but not limited to, inclusivity score(s) 318 indicating a level of meeting inclusion 322 associated with behavior and/or language used during a meeting. The score(s) 318 can be presented as a numerical score, a ranking, a percentage, and/or another inclusivity metric value 320.

The actionable insights 312 can also provide inclusion insight(s) 314 identifying inclusive or non-inclusive behaviors and/or language. The insights 312 is feedback identifying positive and/or negative behaviors and language used in meetings. The actionable insights 312 can also include one or more actionable recommendation(s) 316 (suggestions) for actions the user can take to improve inclusivity during future meetings. The recommendations include suggestions such as, but not limited to, using a hand raise feature to avoid concurrent speech (interruptions), suggested inclusive words to use in place of less inclusive words, etc.

In some examples, the actionable insights 312 are presented to one or more users via a user device 324. The user device 324 is a computing device associated with a user, such as, but not limited to, the user device 118 in FIG. 1 and/or the user device(s) 208 in FIG. 2.

Figure 4:
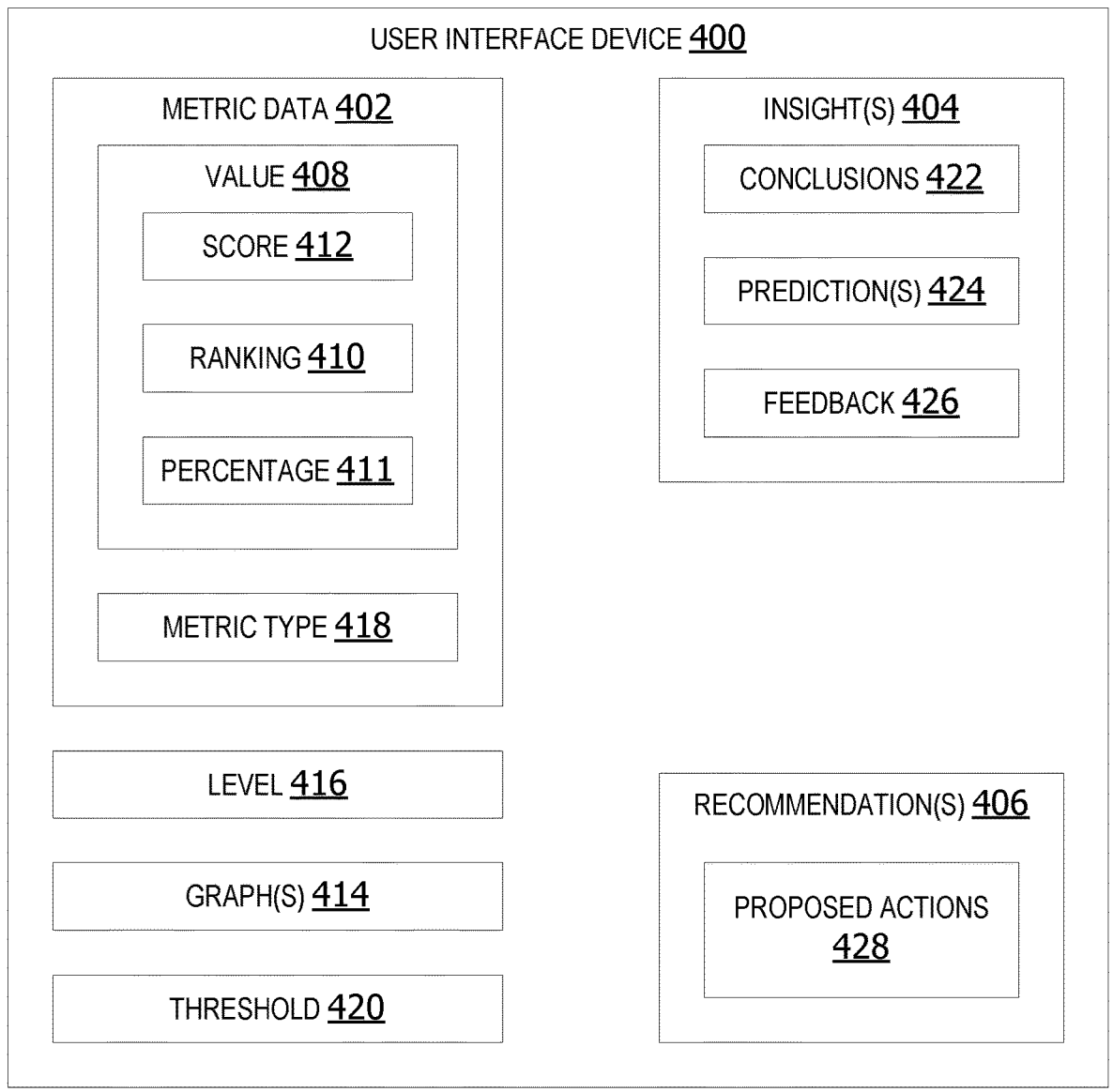
FIG. 4 is a block diagram illustrating a user interface device for displaying inclusivity metric data, inclusivity insights and actionable recommendations according to some embodiments.

FIG. 4 is a block diagram illustrating a user interface device 400 for displaying inclusivity metric data 402, inclusivity insight(s) 404 and actionable recommendation(s) 406 according to some embodiments. The metric data 402 includes an inclusivity metric value 408 indicating a level of inclusivity associated with an inclusivity type 418. An inclusivity type 418 is a type of inclusivity being evaluated or measured by the metric. The type can include speaking/participation type of metric, concurrent speech (interruptions) type of metric, remote versus in-person participation metric type and/or inclusivity of language type of metric.

In some examples, the metric value 408 is a value identifying the level of inclusivity associated with the amount of participation of each meeting attendee, inclusivity of language used, number of interruptions, and other types of inclusivity types at the selected level 416. The metric value 408 can include a score 412, a ranking 410, a percentage 411 or any other type of value.

The level 416 is the selected level at which the metric data is analyzed. The level 416 can optionally include an individual level, a group level, an organization level, or any other type of level. The individual level provides a metric value identifying the level of inclusivity of meeting data for an individual. Metric data, including inclusivity scores, rankings, values, and other individual level information is only provided to the individual. The insights can optionally also provide the metric data in the form of a graph 414, such as a bar graph, line graph, pie chart, table or other graphic representing the metric data.

The inclusivity metric data for a specific individual is private information which is only accessible or made available to the specific individual. This protects user's data and private information. In this example, metric data is made available at an individual level. However, in other examples, metric data is not made available at the individual level. This enables anonymity and protection of individual or user-specific data.

The group level 416 includes metric data associated with a group of meeting participants. In some examples, the group level includes a threshold minimum number of group members to improve user anonymity. Limiting metric data to groups having a threshold minimum number of members prevents a group leader, meeting organizer, manager, or other user from being able to link anonymous metric data to specific meeting participants for improved protection of users.

The selected level 416 in other examples can also include an organization level. The organizational level includes metric data generated for review at an organizational level. The organizational level metric data can include metric data associated with meetings in a plurality of different groups, divisions, or areas of an organization.

The threshold 420 minimum number of participants in a meeting for the group level or organizational level is a user-configurable threshold value. The threshold 420 is any user-configurable number of participants. In one example, the threshold is twelve participants. In this example, the inclusivity insights manager 130 analyzes meeting data from meetings having twelve or more participants. If a meeting has eleven or fewer participants, the meeting data is ineligible for inclusivity analysis to generate inclusivity metrics and insights. In another example, the threshold is eight participants. In this example, the meeting data includes meeting audio or transcripts from meetings having eight or more participants. However, the examples are not limited to a threshold of eight or twelve. The threshold can include any user-configured number of participants.

The insight(s) 404 are automatically generated insights associated with inclusivity metrics, such as, but not limited to, meeting participation, concurrent speech and/or occurrences of inclusive or non-inclusive speech during meetings. The insight(s) 404 include conclusions 422, prediction(s) 424 and/or feedback 426 associated with inclusive or non-inclusive behaviors and language associated with one or more meetings.

The recommendation(s) 406 include one or more proposed actions 428 associated with the metric data 402. The proposed actions 428 include one or more suggested or recommended actions which can be taken by a user to improve inclusive behavior and/or inclusiveness of language used during meetings.

Figure 5:
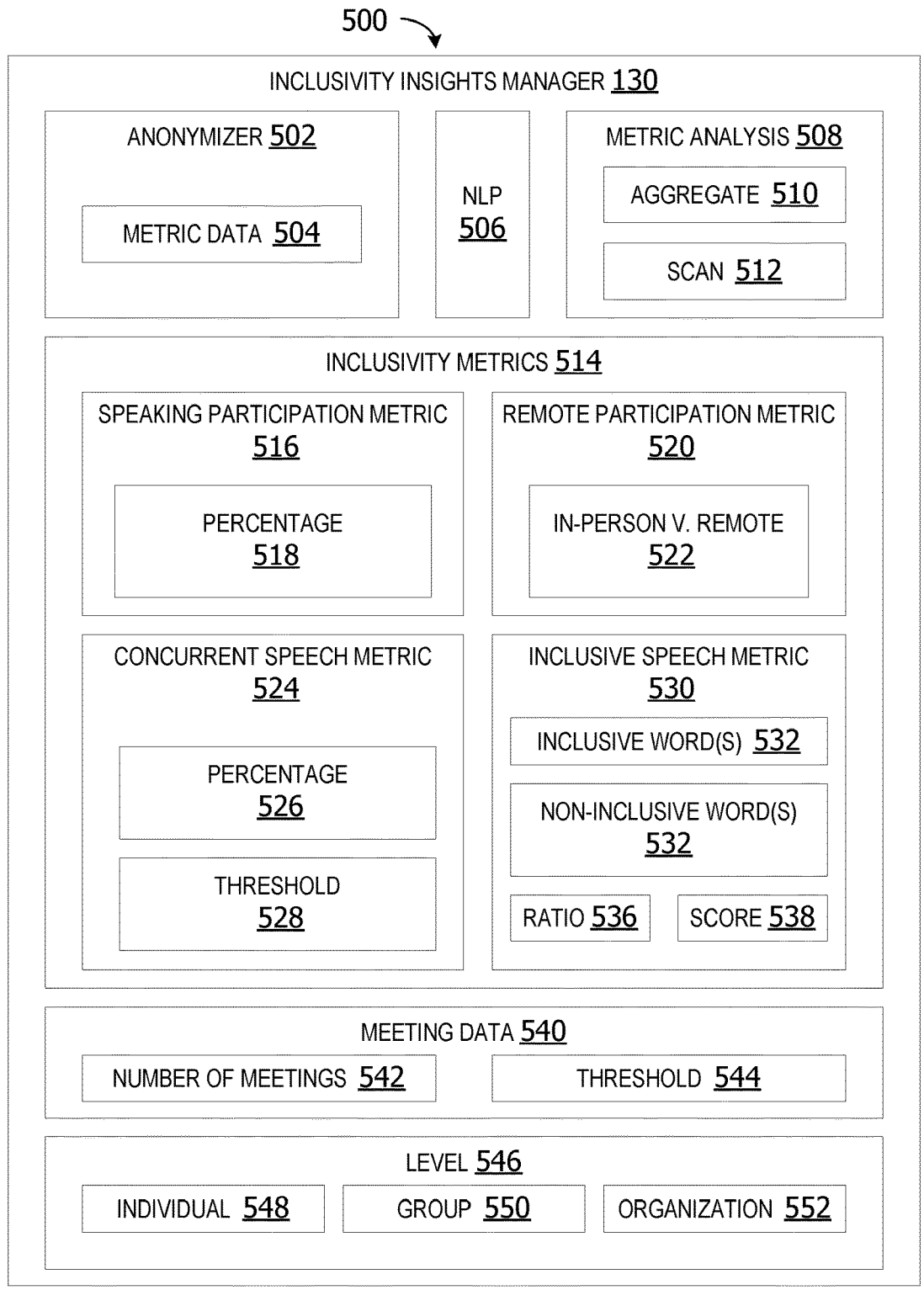
FIG. 5 is a block diagram illustrating an inclusivity insights manager for calculating inclusivity metrics based on meeting data associated with virtual meetings and hybrid meetings according to some embodiments.

FIG. 5 is a block diagram illustrating an inclusivity insights manager 130 for calculating inclusivity metrics based on meeting data associated with virtual meetings and hybrid meetings according to some embodiments. In some examples, the inclusivity insights manager 130 includes an anonymizer 502 which anonymizes the metric data 504 prior to presentation of the metric data to a user. The anonymizer 502 removes user names identifying meeting participants and replaces them with anonymous identifiers.

In other examples, an NLP 506 is optionally included to convert audio data associated with a meeting into transcripts in a word document. The NLP 506 analyzes spoken, natural language and converts it to text. In yet other examples, rather than beginning with the raw audio data, the inclusivity insights manager 130 receives an automatically generated transcript from one or more other applications and/or cloud services. The inclusivity insights manager 130 in some examples, converts the transcript into a CSV file.

In still other examples, the inclusivity insights manager 130 includes a metric analysis 508 algorithm for analyzes aggregate 510 meeting data 540. In one example, the metric analysis 508 performs a scan 512 of the meeting data 540 to identify inclusive or non-inclusive language in one or more meetings.

The inclusivity insights manager 130 analyzes the aggregate meeting data to calculate inclusivity metrics 514. The inclusivity metrics 514 in some examples include a speaking participation metric 516. The speaking participation metric 516 value is provided as a percentage 518 in this example.

The speaking participation metric 516 insights captures the time spoken by every individual in a meeting and aggregates it to figure out how much time each person has spoken in a meeting. It then aggregates it over all the meetings for an organization/leader to provide an aggregated view of speaking participating within meetings. This metric is geared towards ensuring that everyone is included in a meeting.

In some examples, the speaking participation metric 516 insights provides a percentage value indicating most of the attendees (almost everyone) spoke, a percentage range or value indicating a majority (more than half) of the participants spoke, and a percentage value indicating less than half of the meeting attendees (<50%) spoke during the meeting.

The actionable recommendations (proposed actions) provided in response to a low meeting participation score can include, for example, a recommendation to "consider asking organizers to revisit their invitee list for future recurrences of their meetings." Another proposed action includes suggesting the user ask organizers to create a collaborative agenda with input from more invitees and assign agenda items to present. The insights can also include positive feedback, such as, "X Org has done a great job in leading effective meetings and allowing space for everyone to participate!"

Leader insights for percentage participation in some examples includes a percentage value indicating whether everyone almost everyone in the meeting spoke, whether less than half the meeting attendees spoke (50<), or a percentage value or range indicating meeting participation, such as, but not limited to, a fifty to seventy-five percent (50-75%) score indicating more than half the people spoke.

Actionable recommendations for leaders (group level) can include suggesting the user consider revising meeting invitee lists for future recurrences of this meeting or creating a collaborative agenda with input from more invitees and assign agenda items to present. Other recommendations can include suggesting the user create opportunities to bring meeting attendees into the meeting if they have not yet spoken. Feedback can also be provided. The feedback can include positive or negative feedback. Positive feedback can include the following: "Congratulations on leading effective meetings and allowing space for everyone to participate!"

In other examples, the inclusivity metrics 514 includes a remote participation metric 520 for measuring in-person versus remote 522 meeting participation. In other words, the remote participation metric 520 metric measures speaking finds the speaking percentages of employees in a work office against the speaking percentages of employees working remotely and then aggregates it over all the meetings for the leader/org. This metric is geared towards ensuring the inclusion of remote employees in meetings.

In some examples, the metric value is provided as a percentage of participation by in-person meeting participants when compared with participation by remote meeting participants. For example, the insights can include the following: "In-person attendees spoke x % more than remote attendees in meetings in the pre-determined time range." The time range is user-configurable.

The recommendations for the remote participation metric 520 can include suggesting the user consider asking the organizers to suggest using the hand raise feature for every participant in the meeting and follow the order to determine who speaks next. Another example of a recommendation includes suggesting the user to consider asking the organizers to check in with the remote attendees periodically and provide opportunities for them to speak. In still another example of a recommendation includes suggesting the user encourage all attendees to log in to the meeting and keep their video on if possible so that there is greater awareness of all participants in the meeting.

Leader insights are insights provided to users at the organization or leader level. A leader insight can include an insight such as: "In-person attendees spoke x % more than remote attendees in meetings you led in the time range < >." The recommendations associated with this type of insight can include a suggestion that the user consider using the hand raise feature for every participant in the meeting and follow the order to determine who speaks next. Another recommendation includes suggesting the user check in with remote attendees periodically and provide opportunities for them to speak. In still another example, a recommendation can include suggesting the user encourage all attendees to log in to the meeting and keep their video on if possible so that there is greater awareness of all participants in the meeting.

In still other examples, the inclusivity metrics 514 includes a concurrent speech metric 524 for measuring occurrences of interruptions or overlapping speech by two or more meeting participants. The concurrent speech metric 524 value is provided as a percentage 526 in some examples. In other examples, the amount of speech overlap is compared with a threshold 528 concurrent speech value. If the amount of speech overlap is less than the threshold 528, the system does not identify the speech as overlapping speech. If the amount of speech overlap (percentage) is equal to or exceeds the threshold 528, the inclusivity insights manager 130 recognizes the occurrence of the overlapping speech and outputs a metric value for the overlapping speech. In these examples, the threshold value assists the inclusivity insights manager 130 in recognizing minimal levels of overlap which should be ignored as well as recognizing overlap due to technical problems, such as lag or delays in relaying a participants speech to other remote participants in the meeting.

In some examples, the concurrent speech metric is used to find all the instances in a meeting where people speak over each other by analyzing the audio of the meeting and then aggregating it over all the meetings for the leader/organization. This metric is geared towards ensuring that people are not spoken over in meetings. An organization level insight might state that attendees have spoken over each other an average of XX times in meetings over a given time range." Recommendations associated with this concurrent speech insight can include, for example, a suggestion that the user consider asking people to use the hand raise feature and the order of raised hands to ensure everyone can engage effectively.

Another concurrent speech insight can include a conclusion that attendees have spoken over each other an average of XX times in meetings that you lead over a user-configured time range." The recommendation for this insight can include, without limitation, recommending the user consider using the hand raise feature and the order of raised hands to ensure everyone can engage effectively.

The inclusivity metrics 514 in some examples includes an inclusive speech metric 530. The inclusive speech metric measures utilization of inclusive word(s) 532 and/or non-inclusive word(s) 534. The inclusive speech metric is used to analyze the audio or transcript of the meeting and identifies language which is considered non-inclusive. It then aggregates it over meetings and provides a percentage of how many employees have shown this behavior. This is geared towards improving the languages in a meeting. The inclusive speech metric 530 value in some examples is provided as a ratio 536 and/or a score 538.

An example of an organizational insight associated with the inclusive speech metric is as follows: "Attendees in meetings have used inclusive language! Thank you for fostering a meeting environment that promotes inclusivity!" Another organization insight including feedback includes: "Attendees in meetings during < > have used non-inclusive language."

A recommendation associated with this metric includes suggesting the user consider using terms from the inclusive word list or database to ensure that employees are aware of alternatives. Another recommendation can include the follow: "Consider sharing the word cloud above with the org to show how well we are doing with our inclusivity goals and opportunities to improve."

An example of an insight at the group (leader) level is: "Attendees in meetings that you have led during < > have used inclusive language! Thank you for fostering a meeting environment that promotes inclusivity!" A group level (leader) insight including feedback includes the following: "Attendees in meetings that you have led during < > have used non-inclusive language." A recommendation in this situation includes as follows: "Consider suggesting X database to ensure that employees are aware of alternatives."

The inclusivity insights manager 130 applies the inclusivity metrics 514 to meeting data 540 to generate the metric values used to calculate meeting inclusion insights and recommendations. The meeting data 540 is data collected from a threshold 544 minimum number of meetings 542. In some examples, the minimum number of meetings 542 is a user-configurable number of meetings or other configurable minimum number of meetings to protect privacy of member attendees. The threshold 544 minimum number of meetings in other examples is a default threshold value.

The inclusivity insights manager 130 generates inclusivity metrics data for use at a selected level 546, such as, but not limited to, an individual level 548, a group 550 level and/or an organization 552 level. The group level can also be referred to as a leader level, department level and/or a manager level.

These insights and recommendations are used to increase meeting inclusion. Meetings are an ideal place for inclusion as meetings are about coordination, communication, decision-making, and monitoring. Effective meetings allow individual attendees to connect in a highly human way, foster relationship building and enable every person to perform their job in a better, more coordinated, and cooperative manner. Inclusive meetings ensure everyone's voice is heard and all attendees get a chance to contribute where all voices have equal weight.

Figure 6:
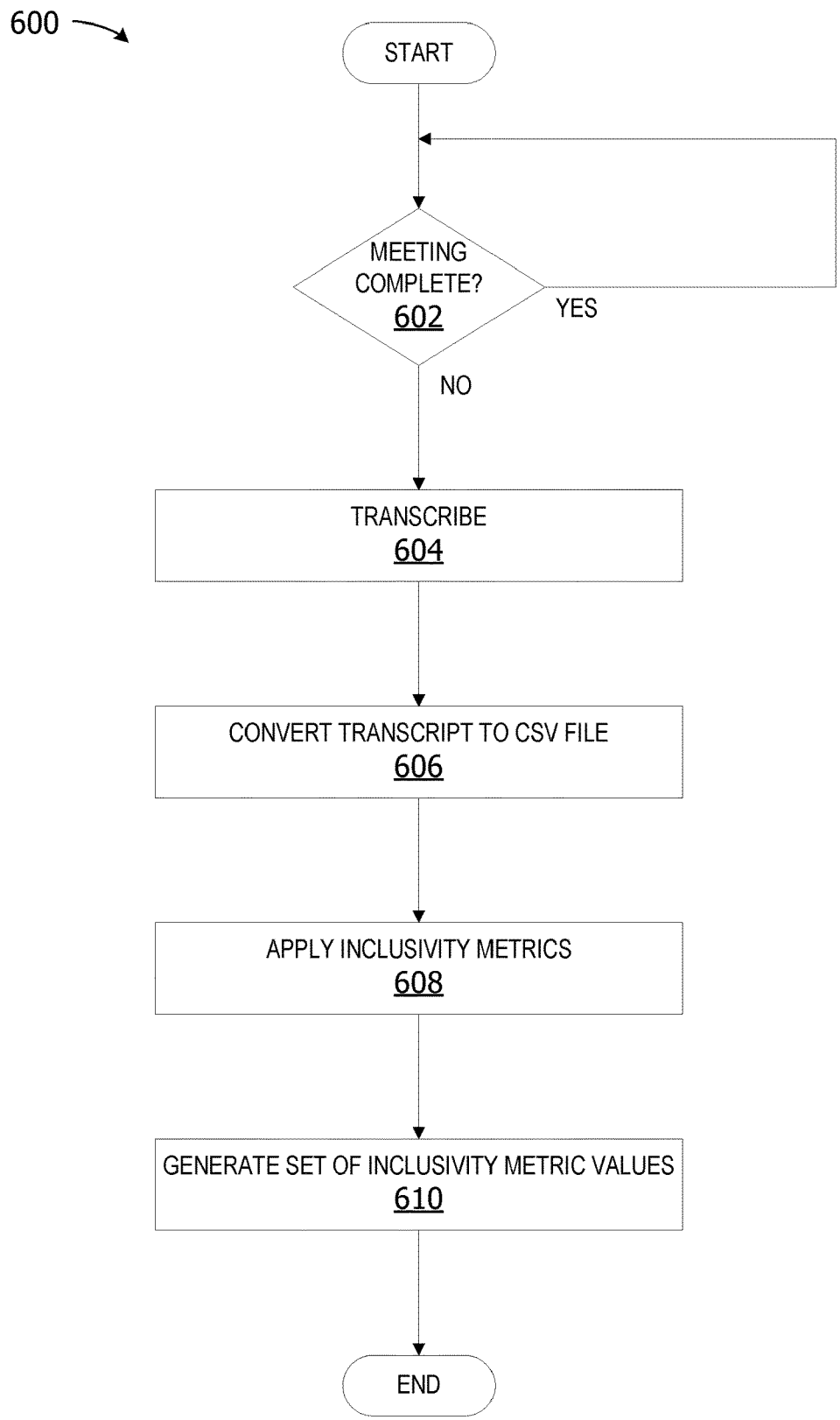
FIG. 6 is a flow chart illustrating operation of the computing device to generate inclusivity metric data according to some embodiments.

FIG. 6 is a flow chart illustrating operation of the computing device to generate inclusivity metric data according to some embodiments. The process shown in FIG. 6 is performed by an inclusivity insights manager, executing on a computing device, such as the computing device 102 in FIG. 1 and/or the user device 118 in FIG. 1.

The process begins by determining if a virtual or hybrid meeting is complete at 602. If yes, the raw meeting audio data is transcribed into text at 604. In some examples, the meeting audio is automatically transcribed by a transcription or NLP application rather than by the inclusivity insights manager. In these examples, the inclusivity insights manager receives the already transcribed meeting data as text in a word document. The inclusivity insights manager converts the transcript to a CSV file at 606. The inclusivity insights manager applies inclusivity metrics to the meeting data at 608. The inclusivity insights manager generates a set of inclusivity metric values at 610. The process terminates thereafter.

While the operations illustrated in FIG. 6 are performed by a computing device, aspects of the disclosure contemplate performance of the operations by other entities. In a non-limiting example, a cloud service on a cloud server performs one or more of the operations. The cloud server is a cloud server such as the cloud server 114 in FIG. 1 and FIG. 3. In another example, one or more computer-readable storage media storing computer-readable instructions may execute to cause at least one processor to implement the operations illustrated in FIG. 6.

Figure 7:
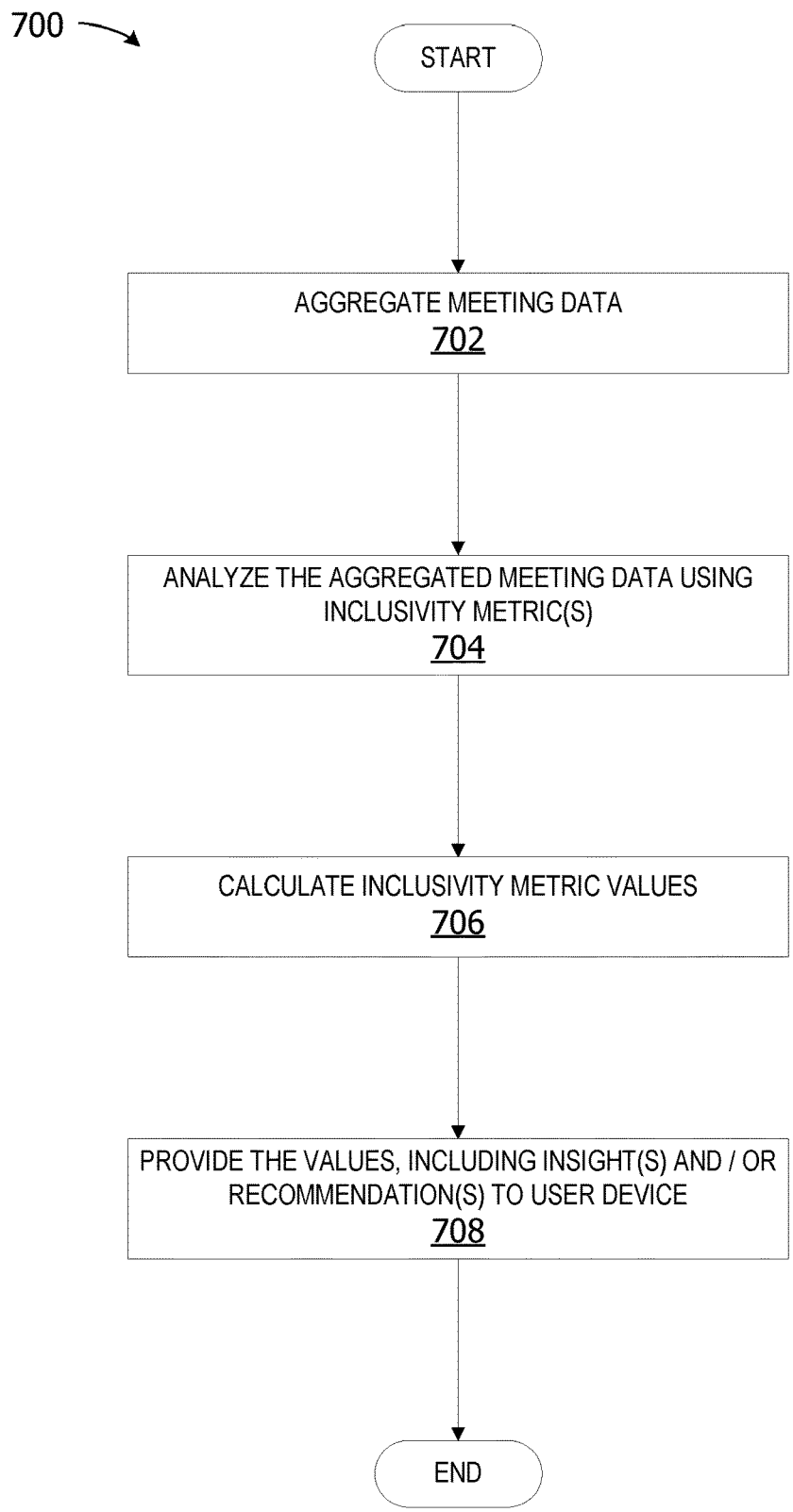
FIG. 7 is a flow chart illustrating operation of the computing device to generate meeting inclusion data according to some embodiments.

FIG. 7 is a flow chart illustrating operation of the computing device to generate meeting inclusion data according to some embodiments. The process shown in FIG. 7 is performed by an inclusivity insights manager, executing on a computing device, such as the computing device 102 in FIG. 1 and/or the user device 118 in FIG. 1.

The process begins by aggregating meeting data at 702. The aggregated meeting data is analyzed using inclusivity metric(s) at 704. The inclusivity insights manager calculates inclusivity metric values at 706. The inclusivity insights manager provides the values, including insight(s) and/or recommendation(s) to a user device at 708. In other examples, the insights and/or recommendations are displayed via a user interface device. The process terminates thereafter.

While the operations illustrated in FIG. 7 are performed by a computing device, aspects of the disclosure contemplate performance of the operations by other entities. In a non-limiting example, a cloud service on a cloud server performs one or more of the operations. The cloud server is a cloud server such as the cloud server 114 in FIG. 1 and FIG. 3. In another example, one or more computer-readable storage media storing computer-readable instructions may execute to cause at least one processor to implement the operations illustrated in FIG. 7.

Figure 8:
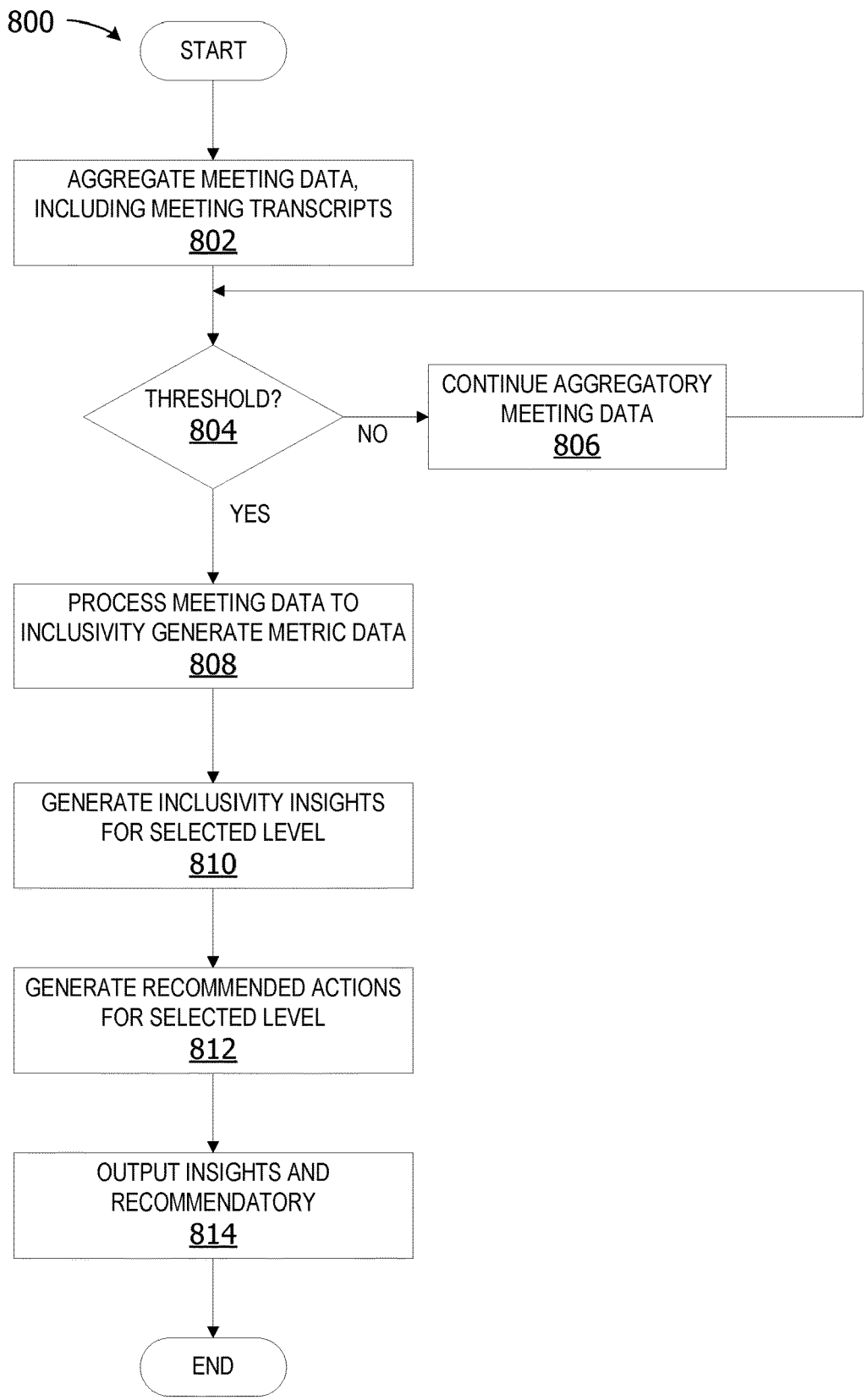
FIG. 8 is a flow chart illustrating operation of the computing device to provide inclusivity insights and actionable recommendations associated with virtual meetings and hybrid meetings according to some embodiments.

FIG. 8 is a flow chart illustrating operation of the computing device to provide inclusivity insights and actionable recommendations associated with virtual meetings and hybrid meetings according to some embodiments. The process shown in FIG. 8 is performed by an inclusivity insights manager, executing on a computing device, such as the computing device 102 in FIG. 1 and/or the user device 118 in FIG. 1.

The process begins by aggregating meeting data, including meeting transcripts at 802. The inclusivity insights manager determines if a minimum threshold number of meeting data is received at 804. If no, the inclusivity insights manager continues aggregating meeting data at 806. The inclusivity insights manager processes meeting data to generate inclusivity metric data at 808. The inclusivity insights manager generates inclusivity insights for selected level at 810. The inclusivity insights manager generates recommended actions for selected level at 812. The inclusivity insights manager outputs the insights and recommendations to a user at 814. The insights and recommendations are output via a user interface. In other examples, the insights and recommendations are transmitted to the user via a network. The process terminates thereafter.

While the operations illustrated in FIG. 8 are performed by a computing device, aspects of the disclosure contemplate performance of the operations by other entities. In a non-limiting example, a cloud service on a cloud server performs one or more of the operations. The cloud server is a cloud server such as the cloud server 114 in FIG. 1 and FIG. 3. In another example, one or more computer-readable storage media storing computer-readable instructions may execute to cause at least one processor to implement the operations illustrated in FIG. 8.

Figure 9:
FIG. 9 is a block diagram illustrating an inclusivity metrics summary page including speaking participation metric data.

FIG. 9 is a block diagram illustrating an inclusivity metrics summary page 900 including speaking participation metric data. The metric data is individual level metrics data specific to a given user. The metric data includes insights 902 including a percentage of active participation by the user in meetings. In this example, the percentage is sixty-five percent participation in meetings. A bar graph 904 is provided breaking down participation by percentage speaking time across meetings the user attended. Recommendations 906 are shown on the left side. The recommendations include a suggestion that the user drop meetings in which the user is not an active participant, be an optional attendee, participate through a chat channel or use a hand raise feature to increase meeting participation in future meetings. The recommendations are designed to push user behavior to ensure their voice in heard in meetings.

The insights and recommendations are not limited to the suggestions shown in FIG. 9. In other examples, the system provides other insights and recommendations not shown in FIG. 9.

Figure 10:
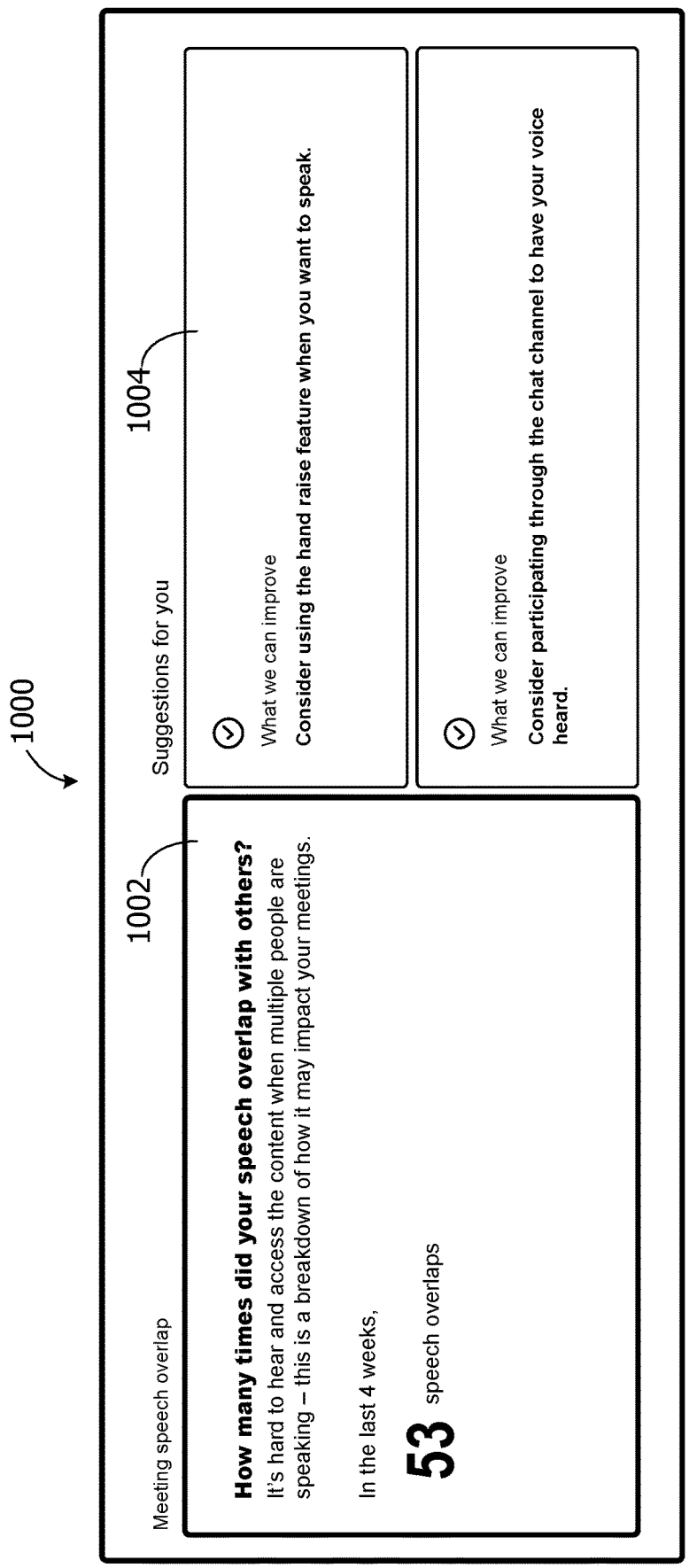
FIG. 10 is a block diagram illustrating an inclusivity metrics summary page including concurrent speech metric data.

FIG. 10 is a block diagram illustrating an inclusivity metrics summary page 1000 including concurrent speech metric data. The speech metric data is data presented at an individual level in this example. The insights 1002 include a meeting speech overlap metric value. In this example, the number of speech overlaps (concurrent speech) is fifty-three.

The recommendations 1004 are shown on the left side in this example. In other examples, the recommendations can be shown on the right side, at the bottom of the page, at the top of the page or on a different page from the insights. The recommendations 1004 includes suggestions to reduce the user's number of speech overlaps occurring during meetings.

The insights and recommendations are not limited to the suggestions shown in FIG. 10. In other examples, the system provides other insights and recommendations not shown in FIG. 10.

Figure 11:
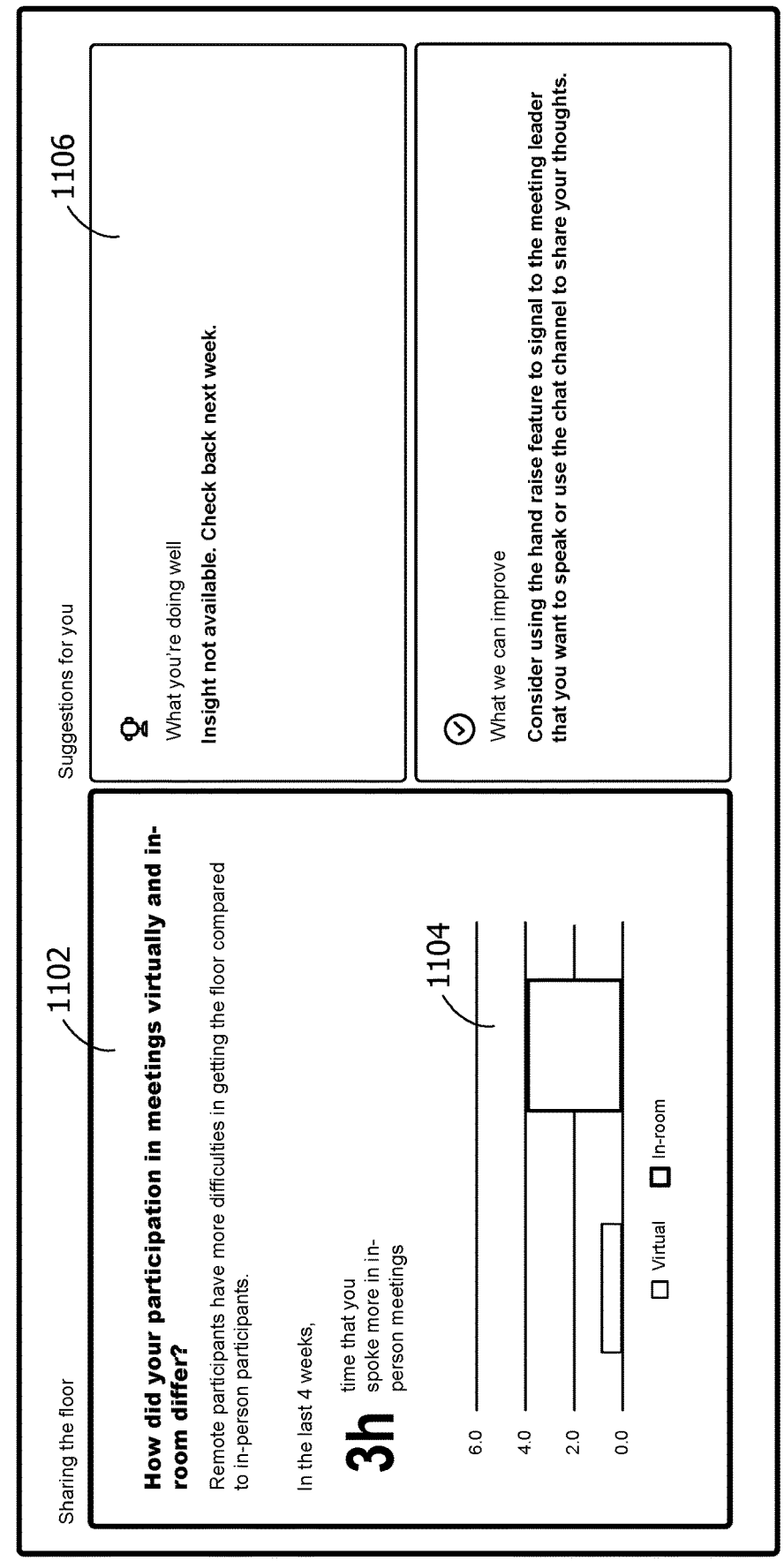
FIG. 11 is a block diagram illustrating an inclusivity metrics summary page including remote participation metric data.

FIG. 11 is a block diagram illustrating an inclusivity metrics summary page 1100 including remote participation metric data. The metric data in this example is at an individual level. The metric data includes insights 1102 describing the user participation in virtual meetings versus in-person meetings. A graph 1104 is optionally provided to illustrate the metric values over multiple meetings. Recommendations 1106 include suggestions to assist the user in improving participation in virtual and in-person meetings.

The insights and recommendations are not limited to the suggestions shown in FIG. 11. In other examples, the system provides other insights and recommendations not shown in FIG. 11.

Figure 12:
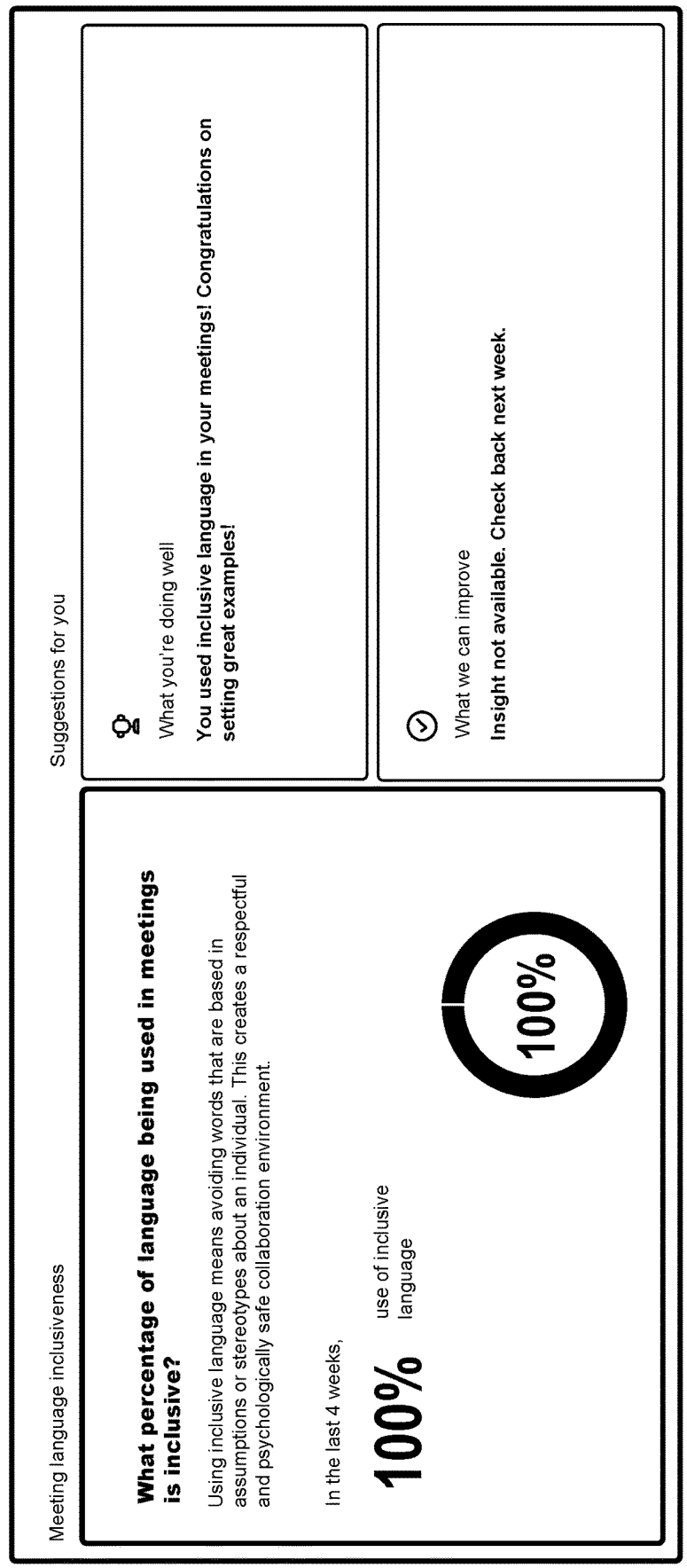
FIG. 12 is a block diagram illustrating an inclusivity metrics summary page including inclusive speech metric data.

FIG. 12 is a block diagram illustrating an inclusivity metrics summary page 1200 including inclusive speech metric data. The metric data is individual level data describing a user's percentage of inclusive language used in meetings. The recommendations include positive feedback and suggestions to improve. The insights and recommendations are not limited to the suggestions shown in FIG. 12. In other examples, the system provides other insights and recommendations not shown in FIG. 12.

FIG. 13 is a block diagram illustrating an inclusivity metrics summary page 1300 including group level inclusivity metrics data. The metrics data in this example is group level data tailored for a meeting leader or meeting organizer. The insights include a percentage value of meeting attendees that participated in the meetings. A bar graph is optionally provided to illustrate meeting participation by all attendees (participants) of the meetings. The recommendations provide suggestions for organizer level action to improve participation by meeting attendees.

The insights and recommendations are not limited to the suggestions shown in FIG. 13. In other examples, the system provides other insights and recommendations not shown in FIG. 13.

FIG. 14 is a block diagram illustrating an inclusivity metrics summary page 1400 including group level concurrent speech metrics data. The metrics data in this example is group level or organizational level data identifying metrics for concurrent speech occurring during meetings. The metrics data provides feedback and actionable recommendations to reduce instances of concurrent speech (overlapping speech) by meeting participants during meetings.

The insights and recommendations are not limited to the suggestions shown in FIG. 14. In other examples, the system provides other insights and recommendations not shown in FIG. 14.

Figure 15:
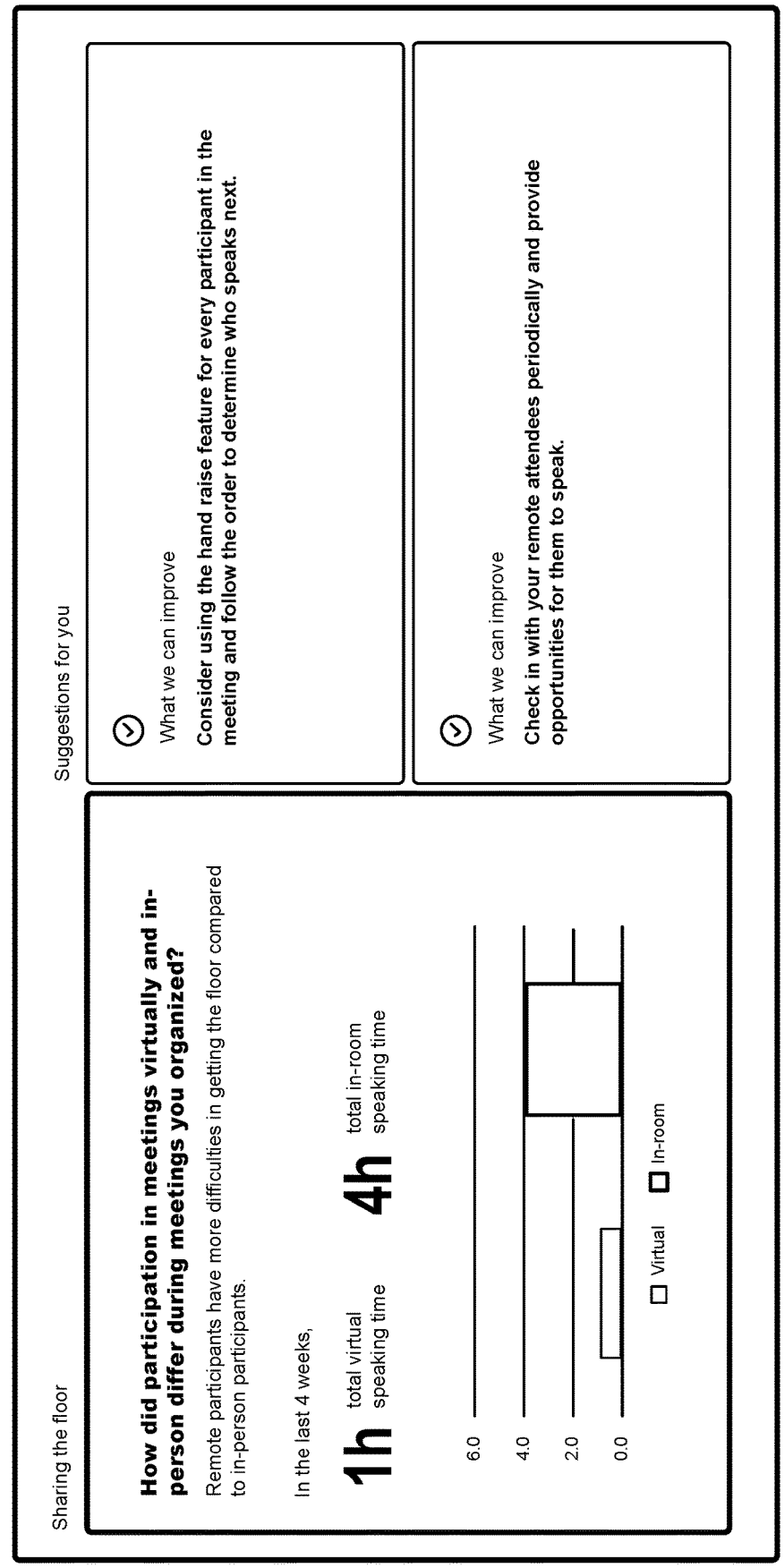
FIG. 15 is a block diagram illustrating an inclusivity metrics summary page including group level remote participation metric data.

FIG. 15 is a block diagram illustrating an inclusivity metrics summary page 1500 including group level remote participation metric data. The metric data in this example is group or organization level data. The insights in this example include metrics for meeting participation and recommendations for improving participation by meeting attendees. The insights and recommendations are not limited to the suggestions shown in FIG. 15. In other examples, the system provides other insights and recommendations not shown in FIG. 15.

In some examples, the system utilizes transcripts, timestamps and other meeting related data obtained directly from the source (remote meeting platform). However, if the transcripts and other data are not directly accessible by the inclusivity metrics generating system to determine speakers in a meeting, the system utilizes an algorithm to generate this data, as shown below in FIGS. 16-22 for converting transcripts, such as Teams generated transcripts, into a CSV format.

FIG. 16A is a block diagram illustrating text 1600 in word format representing content of a meeting that is downloaded from a source after a meeting is recorded. In some examples, to quickly convert the word document to a parse-able format, the transcript in the word document is downloaded by the inclusivity insights manager from the virtual meeting platform chat after the meeting is recorded.

FIG. 16B is a block diagram illustrating a spreadsheet 1602 containing text from the word format file. In this example, the system copies the text from the download transcript and copies it into a spreadsheet for conversion into a CSV file format. This is done automatically by the system. In other examples, inclusivity insights manager copies all text from the downloaded word format document (transcript) into the spreadsheet. The inclusivity insights manager replaces instances of the "→" with " ".

FIG. 16C is a block diagram illustrating adding a column to the spreadsheet 1604 for each meeting participants name. The system adds a column to the left side of the spreadsheet into which the user copied the downloaded text from the transcript. The system sets it to equal the value of row 2 cell 2 (should be the person's name), then copy all the way down.

Figure 16D:
FIG. 16D is a block diagram illustrating concatenation of a start time associated with a user speaking during the meeting.
Figure 17:
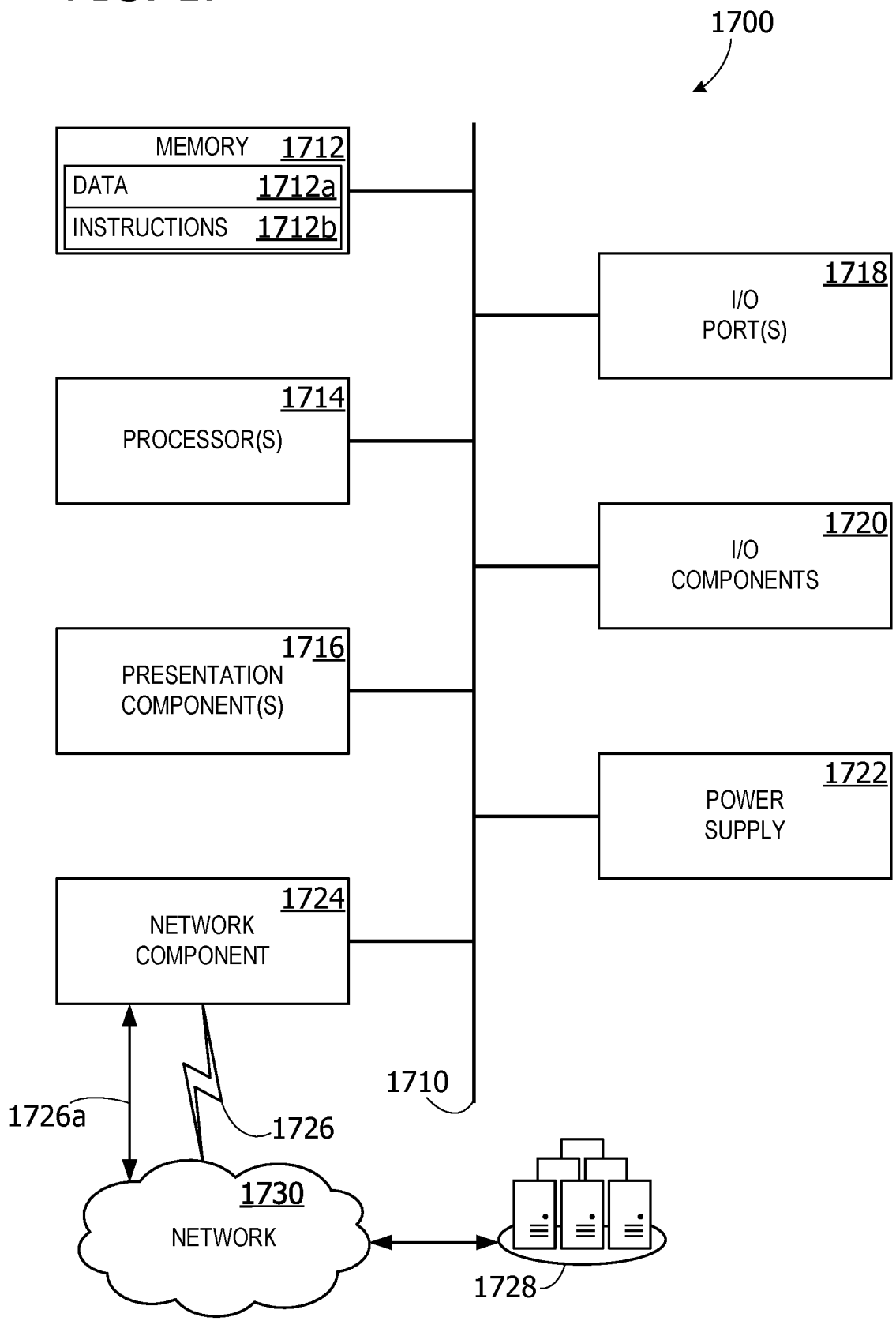
FIG. 17 is a block diagram of an example computing device for implementing aspects disclosed herein and is designated as computing device.

FIG. 16D is a block diagram illustrating concatenation of a start time associated with a user speaking during the meeting. In this example, in column C row 1 of the spreadsheet into which the transcript text has been copied, the formula=CONCAT("2021-10-02T",(CONCAT(LEFT(B1, FIND(" ", B1)−1)," "))) is used to add a start speaking time denoting a time at which a meeting participant began speaking to the spreadsheet 1606 and copy all the way down (the start and end time are in B1 separated by a space, this grabs the first half and appends it to the date).

FIG. 16E is a block diagram illustrating concatenation of an end time associated with a user speaking during the meeting. In this example, in column D row 1 of the spreadsheet 1608 into which the transcript text has been copied, the formula=CONCAT("2021-10-02T",(CONCAT(RIGHT(B1, LEN(B1)-FIND(" ",B1)), "Z"))) is used to add a speaking end time denoting a time at which a meeting participant stopped speaking and copy all the way down (this accomplishes the same thing as step 4 but for the end time).

FIG. 16F is a block diagram illustrating addition of a column to the spreadsheet for true and false values associated with each row. In this example, the inclusivity insights manager adds a column to the left of A within the spreadsheet 1610 into which the transcript text is copied. The formula=ISNUMBER(LEFT(C1)*1) is used to enter a true or false value and then copy all the way down.

FIG. 16G is a block diagram illustrating addition of a filter to copy valid rows from the spreadsheet into a new spreadsheet 1612. In this example, the inclusivity insights manager adds a filter to Cell A1, selects True in filter, and then uses "Go To Special" option to select "Visible Cells Only". The inclusivity insights manager copies all valid (true) rows leaving only valid rows containing a user name, their start speaking time and their end speaking time in each row.

FIG. 16H is a block diagram illustrating changing user names in the new spreadsheet 1614 to a user ID for each user. The inclusivity insights manager transfers the copied cells into a new spreadsheet for additional analysis. For each speaker, a find and replace function is used to replace the user's name with a user ID to anonymize the data and add a conference ID (call ID), which is the same for all rows. If any present users on the call did not speak (this will be found from the amount of user IDs found in the conference ID when the actual data source is used), add a row with their user ID and an active speaker start time (ActiveSpeakerStartTime) equal to the active speaker end time (ActiveSpeakerEndTime) to denote that the meeting attendee never spoke.

In some examples, the inclusivity insights manager splits CSV data in accordance with each meeting. Using CSV test data, the system determine the speaking and interruption percentages of the conference call (meeting) participants as follows:

```
val win_spec =
Window.partitionBy("CallId").orderBy(unix_timestamp(col("ActiveSpeakerStartTime"))).
```

In this example, the data split up by conference ID and ordered by the earliest to latest timestamps. The conference ID is an identifier assigned to a meeting. Each virtual or hybrid meeting is assigned a unique conference ID. The conference ID may also be referred to as a call ID.

The system compares end times indicating when two or more speakers stopped talking to identify concurrent speech. The system adds the previous end time on to each ordered row in the spreadsheet, such as shown in this example:

```
dfModifiedAfterImport = dfImport.withColumn("PrevEndTime",
  lag($"ActiveSpeakerEndTime", 1,
  "").over(win_spec)).withColumn("PrevUserId",
  lag($"ActorId", 1, "").over(win_spec)).
```

The inclusivity insights manager compares the two end times. It keeps track of the previous user ID with a new column and later tallies how many times a user was interrupted by others.

The inclusivity insights manager tracks speaker end times to determine whether a user is interrupted. In some examples, the inclusivity insights manager determines whether the user interrupted someone once they started speaking based on the tracked previous speaker end time. If the two overlapped, the system creates an Interruption column within the spreadsheet having a value of a 1 or a 0 defining if the user is interrupted. The Interruption column can include data such as the following:

```
var dfModified = dfModifiedAfterImport.withColumn("Interruption",
when(col("ActiveSpeakerStartTime").cast("string").contains(col("ActiveSpeakerEndTime").cast
("string")), 0).when(to_timestamp(col("ActiveSpeakerStartTime")) <
to_timestamp(col("PrevEndTime")),
1).otherwise(0)).withColumn("SecFromPrevEndTime",(to_timestamp(col("ActiveSpeakerStartTime")).
cast("long")) –
(to_timestamp(col("PrevEndTime")).cast("long"))).withColumn("Duration",
(to_timestamp(col("ActiveSpeakerEndTime")).cast("long")) –
(to_timestamp(col("ActiveSpeakerStartTime")).cast("long")))
```

In the example shown here, the number of seconds from the previous end time (SecFromPrevEndTime) value may be added as an additional metric that indicates the number of seconds between a speaker's active speaking timestamps.

The inclusivity insights manager in other examples generates a total number of interruptions. The system aggregates the number of interruptions into per-user statistics by totaling the interruption times for each user on each call (meeting). Using the previous user ID column, the system determines how many times each user was interrupted by others. In the following example,

```
var interruptionCounts = dfModified.filter($"Interruption"===1)
interruptionCounts = interruptionCounts.groupBy("PrevUserId",
"CallId").count( ).withColumn("ActorAndCall", concat(col("PrevUserId"),
col("CallId")))
val dataCollect = interruptionCounts.select($"ActorAndCall",$"count").collect( )
var dictionaryOfInterruptions = new mutable.HashMap[String, String]
for((name) <- dataCollect) {
dictionaryOfInterruptions += (name(0).toString_|-> _|name(1).toString)
``` the system combines the user ID and the conference ID (call Id) into a column that is used to split up the interrupted user counts and interruptions counts so they are specific to a conference ID (per-meeting concurrent speech metric data).

In other examples, the inclusivity insights manager generates a percentage value representing an amount of overlapping speech for a meeting. In the following example,

```
var dfGrouped = dfModified.groupBy("CallId", "ActorId", "isRemote").agg(
sum(col("Interruption")).alias("InterruptedOthersCount"),
sum(col("Duration")).alias("TotalDurationSec"),
sum(col("Duration")/ 60).cast("long").alias("TotalDurationMin"))
var dfGroupedSums = dfGrouped.groupBy("CallId").agg(
sum(col("TotalDurationMin")).alias("CallSpeakingMinTotal"))
dfGroupedSums = dfGroupedSums.withColumnRenamed("CallId", "DropCallId")
``` the system groups the metrics data by the conference ID (call Id) and user ID (per-user) based on whether the user was remote or in-person such that each user's sum of interruptions, duration of speaking time, and percent of speaking time can be totaled. The duration of speaking time is divided by the amount of total time of the meeting (conference call). The total meeting time is calculated as the moment two or more users were on the call (in the same virtual/hybrid meeting) and someone spoke, through the last time two or more users were on the call and someone spoke. The system determines the percentages for the inclusivity metrics (speaking time, interruptions, etc.).

The inclusivity insights manager in other examples generates aggregated interrupt count for each meeting. In the following code example:

```
var get_dictionary_value = udf((x: String) => {
  if (!dictionaryOfInterruptions.contains(x))
    0
  dictionaryOfInterruptions.get(x)})
var groupedWithCallSums = dfGrouped.join(dfGroupedSums,
  dfGroupedSums("DropCallId")===dfGrouped("CallId"), "left").withColumn(
    "SpeakingPercent", ((dfGrouped("TotalDurationMin") /
  dfGroupedSums("CallSpeakingMinTotal")) * 100).cast("long")).withColumn(
"WasInterruptedCount", get_dictionary_value(concat($"ActorId", $"CallId")))
```

The inclusivity insights manager joins aggregated data frames together. The dictionary of interrupted counts is used to add to the interruption count (WasInterruptedCount) column, based on the conference ID and user ID. This column is added to each row (data is now in the format: one row=one user's experience on one call).

The inclusivity insights manager determines remote versus in office speaking times. In the following:

```
var totalInCol = groupedWithCallSums.groupBy("CallId").agg(sum("SpeakingPercent"))
var speakingPercents = groupedWithCallSums.groupBy(col("CallId"),
col("IsRemote")).agg(sum("SpeakingPercent").alias("LocationSpeakingPercent"))
var finalDf = groupedWithCallSums.join(speakingPercents,
speakingPercents("CallId")===dfGrouped("CallId") &&
speakingPercents("IsRemote")===dfGrouped("IsRemote"), "left")
finalDf = finalDf.na.fill("0")
finalDf = finalDf.drop("DropCallId"),
``` the remote versus in office speaking percentages are determined by summing the speaking percent of remote users on a call (attending a meeting), and the speaking percent of in office (in person) users on each call. This data frame is joined with the prior data frame containing speaking percentages, interrupted counts (times participant(s) were interrupted), and interruption counts (times participant(s) interrupted others) of each user to create the final metric data results.

Additional Examples

In some examples, inclusivity metrics are aggregated in a non-intrusive way to maintain privacy of users. Meeting data is aggregated anonymously using privacy constraints to eliminate identifying data preventing leaders and managers from connecting specific meeting metrics data to specific meeting participants. This encourages more user participation while protecting user privacy and eliminating the need for surveys.

In other examples, the system extracts audio and user action data from the virtual meeting hosting platform and performs retrospective analysis to surface additional insights surrounding inclusivity. This provides an opportunity to nudge people toward changing their actions for better inclusivity or reinforce positive behavior. The meeting data is analyzed to calculate inclusivity metrics to reveal meeting patterns and generate actionable insights. The insights and recommendations are used to host more inclusive meetings.

In some examples, recommendations are generated and presented to users to assist the users in improving participation and inclusivity of meetings. In other examples the recommendations provided at the individual level include the following: Use the hand raise feature when you want to speak; participate through the chat channel to have your voice heard; use the hand raise feature to signal to the meeting leader that you want to speak; and use the chat channel to share your thoughts. The recommendations can also suggest additional words or alternative words to use during meetings in certain situations to improve participation and inclusion.

The recommendations may vary depending on the type of metric and the selected level. For example, recommendations provided to users at the group level to improve speaking percentage can include the following: consider revisiting your invitee list for future recurrences of this meeting; consider creating a collaborative agenda with input from more invitees and assign agenda items to present and monitor who has not spoken and create opportunities to bring them into the conversation. The recommendations provided at the group level to reduce speaking overlap includes asking the meeting leader to consider using the hand raise feature and the order of raised hands to ensure everyone can engage effectively. The recommendations provided to a user at the group level to increase virtual (remote) participant speaking time includes the following: encourage all attendees to log in to the meeting and keep their video on if possible so that there is greater awareness of all participants in the meeting.

In other examples, the insights and recommendations are templates or pre-defined responses that are tied to or mapped to each type of metric and selected level. When an insight or recommendation is generated for a given metric and selected level (individual, group, or organization), the system maps the metric and level to the insights and recommendations. A set of insights and/or recommendations are retrieved from the database and output to the user. In some examples, the mapped insights and recommendations are templates which can be modified or customized to the user based on user-preferences, history data and/or metric values generated for the user.

In an example scenario, an algorithm converts auto-generated meeting transcript documents (.docx) to CSV (.csv) with speaker and call IDs, speaking timestamps, speaker text, etc. The system uses SCALA to aggregate interruptions, percent speaking time, remote vs. in-person metrics per call and per meeting participant. Policheck is used to scan meeting data for non-inclusive language and aggregated flagged instances across meetings at the person and meeting level. Insights and recommendations are delivered to users suggesting actions for meeting participants and organizers to take. Metrics are not biased towards one behavior type (people who talk more, chat more in meetings, etc.). The system groups similar meetings to compare meetings with highest, lowest, or moderate (medium) participation without highlighting numbers.

In other examples, the data is anonymized by removing user names and replacing the user names with user ID. The metric values and insights can be further anonymized by providing insights and values in terms of bands, groups, or ranges instead of providing absolute numbers. Thus, if there were two meeting participants that were causing the majority of speech overlaps, the anonymizer might give the percentages of overlapping speech in terms of time rather than providing the number of participants that were overlapping speech to further protect the identity of the participants and prevent the participants from being linked to the instances of concurrent speech. Likewise, the number or percentage values associated with users not participating in meetings may be given as a range or band of values to provide an additional layer of anonymity preventing users from tying metric data to specific meeting attendees.

Alternatively, or in addition to the other examples described herein, examples include any combination of the following:

an aggregator associated with the inclusivity insights manager, the aggregator aggregates meeting data associated with the plurality of meetings attended by the plurality of participants, the aggregated meeting data comprising audio data for a threshold minimum number of meetings;

a speaking participation metric value comprising a percentage value indicating a percentage of meeting attendees speaking during at least one meeting;

a remote participation metric value comprising a percentage value indicating a percentage of in-person meeting attendees speaking during at least one meeting versus remote meeting attendees speaking during the at least one meeting;

a concurrent speech metric value comprising a percentage value indicating an amount of concurrent speech occurring during at least one meeting in the plurality of meetings;

an inclusive speech metric value indicating an amount of non-inclusive speech occurring during at least one meeting in the plurality of meetings;

an anonymizer that anonymizes metric data generated by the inclusivity insights manager;

analyzing meeting data including audio data associated with at least one meeting in a plurality of meetings using an inclusivity metric, the inclusivity metric comprising a metric for evaluating a level of meeting inclusion associated with a plurality of attendees participating in the at least one meeting;

calculating an inclusivity metric value associated with the inclusivity metric;

providing the inclusivity metric value via a user interface device, the inclusivity metric value comprising an actionable recommendation for improving meeting inclusion in a next meeting attended by at least one participant in the plurality of participants;

displaying the inclusivity metric value, including the actionable recommendation and an inclusivity insight;

aggregating the meeting data associated with a threshold minimum number of meetings, the aggregated meeting data comprising audio data for the threshold minimum number of meetings;

calculating a speaking participation metric value comprising a percentage value indicating a percentage of meeting attendees speaking during at least one meeting;

calculating a remote participation metric value comprising a percentage value indicating a percentage of in-person meeting attendees speaking during at least one meeting versus remote meeting attendees speaking during the at least one meeting;

calculating a concurrent speech metric value comprising a percentage value indicating an amount of concurrent speech occurring during at least one meeting in the plurality of meetings;

calculating an inclusive speech metric value indicating an amount of non-inclusive speech occurring during at least one meeting in the plurality of meetings;

aggregate meeting data associated with a plurality of meetings attended by a plurality of participants, the meeting data comprising audio data of the plurality of meetings or a transcript of the audio data of the plurality of meetings;

analyze the meeting data using an inclusivity metric for evaluating meeting inclusion associated with the plurality of participants attending at least one meeting in the plurality of meetings;

calculate an inclusivity metric value using the meeting data and the inclusivity metric, the inclusivity metric value comprising a score indicating a level of inclusivity associated with at least one participant in the plurality of participants attending at least one meeting in the plurality of meetings;

provide the inclusivity metric value to at least one user via a user interface device;
aggregate meeting data for a threshold minimum number of meetings;
calculate a speaking participation metric value comprising a percentage value indicating a percentage of meeting attendees speaking during at least one meeting;
calculate a remote participation metric value comprising a percentage value indicating a percentage of in-person meeting attendees speaking during at least one meeting versus remote meeting attendees speaking during the at least one meeting;
calculate a concurrent speech metric value comprising a percentage value indicating an amount of concurrent speech occurring during at least one meeting in the plurality of meetings; and
calculate an inclusive speech metric value indicating an amount of non-inclusive speech occurring during at least one meeting in the plurality of meetings.

At least a portion of the functionality of the various elements in FIG. 1, FIG. 2, FIG. 3, FIG. 4, and FIG. 5 can be performed by other elements in FIG. 1, FIG. 2, FIG. 3, FIG. 4 and FIG. 5, or an entity (e.g., processor 106, web service, server, application program, computing device, etc.) not shown in FIG. 1, FIG. 2, FIG. 3, FIG. 4, and FIG. 5.

In some examples, the operations illustrated in FIG. 6, FIG. 7 and FIG. 8 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of calculating inclusivity metrics, the method comprising analyzing meeting data including audio data associated with at least one meeting in a plurality of meetings using an inclusivity metric, the inclusivity metric comprising a metric for evaluating a level of meeting inclusion associated with a plurality of attendees participating in the at least one meeting; calculating an inclusivity metric value associated with the inclusivity metric; and providing the inclusivity metric value via a user interface device, the inclusivity metric value comprising an actionable recommendation for improving meeting inclusion in a next meeting attended by at least one participant in the plurality of participants.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Example Operating Environment

FIG. 31 is a block diagram of an example computing device 3100 for implementing aspects disclosed herein and is designated generally as computing device 3100. The computing device 3100 is a computing device, such as the computing device 102 in FIG. 1. The computing device 3100 is an example of a suitable computing environment and is not intended to suggest any limitation as to the scope of use or functionality of the examples disclosed herein. Neither should computing device 3100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 3100 includes a bus 3110 that directly or indirectly couples the following devices: computer-storage memory 3112, one or more processors 3114, one or more presentation components 3116, I/O ports 3118, I/O components 3120, a power supply 3122, and a network component 3124. While computing device 3100 is depicted as a single device, multiple computing devices 3100 may work together and share the depicted device resources. For example, memory 3112 may be distributed across multiple devices, and processor(s) 3114 may be housed with different devices.

Bus 3110 represents what may be one or more busses (such as an address bus, data bus, or a combination thereof). Although the various blocks of FIG. 31 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 31 and the references herein to a "computing device."

Memory 3112 may take the form of the computer-storage media references below and operatively provide storage of computer-readable instructions, data structures, program modules and other data for computing device 3100. In some examples, memory 3112 stores one or more of an operating system, a universal application platform, or other program modules and program data. Memory 3112 is thus able to store and access data 3112a and instructions 3112b that are executable by processor 3114 and configured to carry out the various operations disclosed herein.

In some examples, memory 3112 includes computer-storage media in the form of volatile and/or nonvolatile memory, removable or non-removable memory, data disks in virtual environments, or a combination thereof. Memory 3112 may include any quantity of memory associated with or accessible by computing device 3100. Memory 3112 may be internal to computing device 3100 (as shown in FIG. 31), external to computing device 3100 (not shown), or both (not shown).

Examples of memory 3112 in include, without limitation, RAM; read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 3100. Additionally, or alternatively, memory 3112 may be distributed across multiple computing devices 3100, for example, in a virtualized environment in which instruction processing is carried out on multiple computing devices 3100. For the purposes of this disclosure, "computer storage media," "computer storage device," "computer-storage memory," "memory," and "memory devices" are synonymous terms for computer-storage memory 3112, and none of these terms include carrier waves or propagating signaling.

Processor(s) 3114 may include any quantity of processing units that read data from various entities, such as memory 3112 or I/O components 3120 and may include CPUs and/or GPUs. Specifically, processor(s) 3114 are programmed to execute computer-executable instructions for implementing aspects of the disclosure. The instructions may be performed by the processor, by multiple processors within computing device 3100, or by a processor external to client computing device 3100. In some examples, processor(s) 3114 are programmed to execute instructions such as those illustrated in the in the accompanying drawings.

Moreover, in some examples, processor(s) 3114 represent an implementation of analog techniques to perform the operations described herein. For example, the operations may be performed by an analog client computing device 3100 and/or a digital client computing device 3100. Presentation component(s) 3116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 3100, across a wired connection, or in other ways. I/O ports 1618 allow computing device 3100 to be logically coupled to other devices including I/O components 3120, some of which may be built in. Example I/O components 3120 include, for example but without limitation, a microphone, joystick, game pad, satellite dish, scanner, printer, wireless device, etc.

Computing device 3100 may operate in a networked environment via network component 3124 using logical connections to one or more remote computers. In some examples, network component 3124 includes a network interface card and/or computer-executable instructions (e.g., a driver) for operating the network interface card. Communication between computing device 3100 and other devices may occur using any protocol or mechanism over any wired or wireless connection.

In some examples, network component 3124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 3124 communicates over wireless communication link 3126 and/or a wired communication link 3126*a* to a cloud resource 3128 across network 3130. Various different examples of communication links 3126 and 3126*a* include a wireless connection, a wired connection, and/or a dedicated link, and in some examples, at least a portion is routed through the internet.

Although described in connection with an example computing device 3100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Example Operating Environment

FIG. 31 is a block diagram of an example computing device 3100 for implementing aspects disclosed herein and is designated as computing device 3100. The computing device 3100 is a computing device, such as the computing device 102 in FIG. 1. The computing device 3100 is an example of a suitable computing environment and is not intended to suggest any limitation as to the scope of use or functionality of the examples disclosed herein. Neither should computing device 3100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 3100 includes a bus 3110 that directly or indirectly couples the following devices: computer-storage memory 3112, one or more processors 3114, one or more presentation components 3116, I/O ports 3118, I/O components 3120, a power supply 3122, and a network component 3124. While computing device 3100 is depicted as a single device, multiple computing devices 3100 may work together and share the depicted device resources. For example, memory 3112 may be distributed across multiple devices, and processor(s) 3114 may be housed with different devices.

Bus 3110 represents what may be one or more busses (such as an address bus, data bus, or a combination thereof). Although the various blocks of FIG. 31 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 31 and the references herein to a "computing device."

Memory 3112 may take the form of the computer-storage media references below and operatively provide storage of computer-readable instructions, data structures, program modules and other data for computing device 3100. In some examples, memory 3112 stores one or more of an operating system, a universal application platform, or other program modules and program data. Memory 3112 is thus able to store and access data 3112a and instructions 3112b that are executable by processor 3114 and configured to carry out the various operations disclosed herein.

In some examples, memory 3112 includes computer-storage media in the form of volatile and/or nonvolatile memory, removable or non-removable memory, data disks in virtual environments, or a combination thereof. Memory 3112 may include any quantity of memory associated with or accessible by computing device 3100. Memory 3112 may be internal to computing device 3100 (as shown in FIG. 31), external to computing device 3100 (not shown), or both (not shown).

Examples of memory 3112 in include, without limitation, RAM; read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 3100. Additionally, or alternatively, memory 3112 may be distributed across multiple computing devices 3100, for example, in a virtualized environment in which instruction processing is carried out on multiple computing devices 3100. For the purposes of this disclosure, "computer storage media," "computer storage device," "computer-storage memory," "memory," and "memory devices" are synonymous terms for computer-storage memory 3112, and none of these terms include carrier waves or propagating signaling.

Processor(s) 3114 may include any quantity of processing units that read data from various entities, such as memory 3112 or I/O components 3120 and may include CPUs and/or GPUs. Specifically, processor(s) 3114 are programmed to execute computer-executable instructions for implementing aspects of the disclosure. The instructions may be performed by the processor, by multiple processors within computing device 3100, or by a processor external to client computing device 3100. In some examples, processor(s) 3114 are programmed to execute instructions such as those illustrated in the in the accompanying drawings.

Moreover, in some examples, processor(s) 3114 represent an implementation of analog techniques to perform the operations described herein. For example, the operations may be performed by an analog client computing device 3100 and/or a digital client computing device 3100. Presentation component(s) 3116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 3100, across a wired connection, or in other ways. I/O ports 1618 allow computing device 3100 to be logically coupled to other devices including I/O components 3120, some of which may be built in. Example I/O components 3120 include, for example but without limitation, a microphone, joystick, game pad, satellite dish, scanner, printer, wireless device, etc.

Computing device 3100 may operate in a networked environment via network component 3124 using logical connections to one or more remote computers. In some examples, network component 3124 includes a network interface card and/or computer-executable instructions (e.g., a driver) for operating the network interface card. Communication between computing device 3100 and other devices may occur using any protocol or mechanism over any wired or wireless connection.

In some examples, network component 3124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 3124 communicates over wireless communication link 3126 and/or a wired communication link 3126a to a cloud resource 3128 across network 3130. Various different examples of communication links 3126 and 3126a include a wireless connection, a wired connection, and/or a dedicated link, and in some examples, at least a portion is routed through the internet.

Although described in connection with an example computing device 3100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a data storage device storing meeting data associated with a plurality of meetings, the meeting data comprising at least one of meeting audio data associated with a meeting in the plurality of meetings and a transcript of the meeting audio data;
a processor communicatively coupled to a memory, the memory comprising an inclusivity insights manager that, when executed by the processor, causes the processor to:
aggregate, by an aggregator implemented on the inclusivity insights manager, the meeting audio data for a threshold minimum number of meetings having a threshold minimum number of participants of the plurality of meetings;
analyze the aggregated meeting data using an inclusivity metric to measure a level of inclusivity associated with a plurality of participants attending a meeting in the plurality of meetings; and
generate inclusivity metric data for the meeting; and
a communication interface that transmits the inclusivity metric data generated to a user device, the user device including a user interface to present the inclusivity metric data.

2. The system of claim 1 wherein the inclusivity insights manager further causes the processor to:
anonymize the meeting data, including replacing names of the plurality of participants with anonymous identifiers, such that the inclusivity metric data generated for the meeting is anonymized as to attendee identification.

3. The system of claim 1 wherein generating the inclusivity metric data by the inclusivity insights manager further causes the processor to:
calculate an inclusivity insight and an actionable recommendation associated with the meeting.

4. The system of claim 1 wherein generating the inclusivity metric data by the inclusivity insights manager further causes the processor to:
calculate a remote participation metric, the remote participation metric indicating a value of in-person participation versus remote participation in the meeting.

5. The system of claim 4 wherein generating the inclusivity metric data by the inclusivity insights manager further causes the processor to:
generate an actionable recommendation associated with the remote participation metric, the actionable recommendation including at least one of a recommendation for meeting organizers to suggest using a hand raise feature during a future meeting, a recommendation for meeting organizers to check in with remote attendees periodically during the future meeting, a recommendation for meeting organizers to encourage all meeting participants keep video on during the future meeting.

6. The system of claim 1 wherein generating the inclusivity metric data by the inclusivity insights manager further causes the processor to:
calculate a speaking participation metric, the speaking participation metric indicating a value associated with speaking participation by each participant of the plurality of participants in the meeting.

7. The system of claim 1 wherein generating the inclusivity metric data by the inclusivity insights manager further causes the processor to:
calculate an inclusive speech metric, the inclusive speech metric indication a value of inclusive words and/or non-inclusive words utilized in the meeting.

8. The system of claim 7 wherein generating the inclusivity metric data by the inclusivity insights manager further causes the processor to:
generate an actionable recommendation associated with the inclusive speech metric, the actionable recommendation including at least one of a recommendation to use terms from an inclusive word list during a future meeting, a recommendation to share a word cloud demonstrating a current metric of an inclusivity goal and opportunities to improve the current metric.

9. A computer-implemented method comprising:
storing, on a data storage device, meeting data associated with a plurality of meetings, the meeting data comprising at least one of meeting audio data associated with a meeting in the plurality of meetings and a transcript of the meeting audio data;
aggregating, by an inclusivity insights manager implemented on a processor, the meeting audio data for a threshold minimum number of meetings having a threshold minimum number of participants of the plurality of meetings;
analyzing, by the inclusivity insights manager, the aggregated meeting data using an inclusivity metric to measure a level of inclusivity associated with a plurality of participants attending a meeting in the plurality of meetings;
generating inclusivity metric data for the meeting; and
transmitting, by a communication interface coupled to the processor, the inclusivity metric data generated to a user device, the user device including a user interface to present the inclusivity metric data.

10. The computer-implemented method of claim 9, wherein generating the inclusivity metric data further comprises:
anonymizing the meeting data, including replacing names of the plurality of participants with anonymous identifiers, such that the inclusivity metric data generated for the meeting is anonymized as to attendee identification.

11. The computer-implemented method of claim 9, wherein generating the inclusivity metric data further comprises:
calculating an inclusivity insight and an actionable recommendation associated with the meeting.

12. The computer-implemented method of claim 9 wherein the inclusivity metric data generated includes a low meeting participation score, and wherein the actionable recommendation includes at least one of a recommendation for meeting organizers to revisit the invitee list for future recurrences of the meeting, a recommendation for meeting organizers to create a collaborative agenda with input from more invitees for future recurrences of the meeting, a recommendation for meeting organizers to assign invitees with agenda items to present for future recurrences of the meeting.

13. The computer-implemented method of claim 9 wherein the inclusivity metric data generated includes an inclusive speech metric score based on a number of non-inclusive words detected, and wherein the actionable recommendation is a recommendation to replace a non-inclusive word with an inclusive word during a future meeting.

14. The computer-implemented method of claim 9 wherein the inclusivity metric data generated includes a remote participation metric indicating a value of in-person participation versus remote participation in the meeting, and wherein the actionable recommendation includes at least one of a recommendation for meeting organizers to suggest using a hand raise feature during a future meeting, a recommendation for meeting organizers to check in with remote attendees periodically during the future meeting, a recommendation for meeting organizers to encourage all meeting participants keep video on during the future meeting.

15. The computer-implemented method of claim 9 wherein the inclusivity metric data includes a speaking participation metric, the speaking participation metric indicating a value associated with speaking participation by each participant of the plurality of participants in the meeting.

16. The computer-implemented method of claim 9 wherein the inclusivity metric data includes a concurrent speech metric measuring a level of overlapping speech occurring during a configurable number of meetings, and wherein the actionable recommendation is to utilize a virtual meeting feature during a future meeting.

17. A computer-readable medium storing instructions that, when executed by a processor, cause the processor to:
   store, on a data storage device, meeting data associated with a plurality of meetings, the meeting data comprising at least one of meeting audio data associated with a meeting in the plurality of meetings and a transcript of the meeting audio data;
   aggregate the meeting audio data for a threshold minimum number of meetings having a threshold minimum number of participants of the plurality of meetings;
   analyze the aggregated meeting data using an inclusivity metric to measure a level of inclusivity associated with a plurality of participants attending a meeting in the plurality of meetings;
   calculate inclusivity metric data for the meeting; and
   control a communication interface to transmit the inclusivity metric data calculated to a user device, the user device including a user interface to present the inclusivity metric data.

18. The computer-readable medium of claim 17 further storing instructions that, when executed by the processor, further cause the processor to:
   anonymize the meeting data, including replacing names of the plurality of participants with anonymous identifiers, such that the inclusivity metric data calculated for the meeting is anonymized as to attendee identification.

19. The computer-readable medium of claim 17 further storing instructions that, when executed by the processor, further cause the processor to:
   calculate an inclusivity insight and an actionable recommendation associated with the meeting.

20. The computer-readable medium of claim 17 further storing instructions that, when executed by the processor, further cause the processor to:
   calculate a remote participation metric, the remote participation metric indicating a value of in-person participation versus remote participation in the meeting.

* * * * *